(12) United States Patent
Komura et al.

(10) Patent No.: US 8,098,547 B2
(45) Date of Patent: Jan. 17, 2012

(54) OPTICAL WAVEGUIDE AND THERMAL ASSIST MAGNETIC RECORDING HEAD THEREWITH

(75) Inventors: Eiji Komura, Tokyo (JP); Tsutomu Chou, Tokyo (JP); Koji Shimazawa, Tokyo (JP); Seiichi Takayama, Tokyo (JP)

(73) Assignee: TDK Corporation, Tokyo (JP)

( * ) Notice: Subject to any disclaimer, the term of this patent is extended or adjusted under 35 U.S.C. 154(b) by 135 days.

(21) Appl. No.: 12/720,083

(22) Filed: Mar. 9, 2010

(65) Prior Publication Data
US 2011/0222184 A1 Sep. 15, 2011

(51) Int. Cl.
*G11B 11/00* (2006.01)
(52) U.S. Cl. .................. 369/13.33; 369/112.27; 360/59
(58) Field of Classification Search ............... 369/13.01, 369/13.33, 13.32, 112.27, 13.17, 13.24, 13.12, 369/13.13; 360/59, 245.3; 385/126, 43, 385/14, 40
See application file for complete search history.

(56) References Cited

U.S. PATENT DOCUMENTS

| | | | |
|---|---|---|---|
| 6,768,556 B1 | 7/2004 | Matsumoto et al. | |
| 7,133,230 B2 * | 11/2006 | Saga et al. | 360/59 |
| 7,330,404 B2 | 2/2008 | Peng et al. | |
| 2003/0066944 A1 | 4/2003 | Matsumoto et al. | |
| 2004/0081031 A1 | 4/2004 | Saga et al. | |
| 2008/0151431 A1 | 6/2008 | Tanaka et al. | |
| 2011/0205660 A1 * | 8/2011 | Komura et al. | 360/59 |

OTHER PUBLICATIONS

"Optical Technologies and Applications," *Intel Technology Journal*, vol. 8, Issue 2, pp. 153-156, May 10, 2004.

* cited by examiner

*Primary Examiner* — Ali Neyzari
(74) *Attorney, Agent, or Firm* — Posz Law Group, PLC

(57) ABSTRACT

An optical waveguide, on account of its ability to apply phase resonance of a wavelength and of a first and second triangular plate-like spot size converter members formed of the same material as a core material and being arranged and formed in a substantially symmetrical structure, can promote shortening of the waveguide length and contrive to reduce the size of the optical waveguide itself. Further, an optical waveguide having excellent spot size conversion efficiency can be obtained even in a reduced size.

11 Claims, 15 Drawing Sheets

OPTICAL WAVEGUIDE AND THERMAL ASSIST MAGNETIC RECORDING HEAD THEREWITH

BACKGROUND OF THE INVENTION

1. Field of the Invention

The present invention relates to an optical waveguide and a thermal assist magnetic recording head (or thermally-assisted magnetic recording head) that uses the same.

2. Description of Related Art

Further improvement to thin film magnetic heads and magnetic recording media is in demand in conjunction with the promotion of high recording density in magnetic disk devices in the field of magnetic recording using a head and medium. At the present time, composite type thin film magnetic heads, including a structure where a magnetoresistive (MR) element for reading and an electromagnetic conversion element for writing are laminated, are widely used as thin film magnetic heads.

Meanwhile, the magnetic recording medium is a so-called discontinuous body on which magnetic microparticles aggregate, and each of the magnetic microparticles is a single magnetic domain structure. Here, a single recording bit is configured from a plurality of magnetic microparticles. Accordingly, in order to increase the recording density, unevenness of the recording bit boundary must be reduced by reducing the size of the magnetic microparticles. However, reducing the size of the magnetic microparticles produces the problem of a reduction in the thermal stability of magnetization that accompanies volume reduction.

Increasing the magnetic anisotropy energy Ku of the magnetic microparticles can be considered as a countermeasure for such a problem. However, an increase in Ku causes an increase in the anisotropic magnetic field (coercive force) of the magnetic recording medium. In this regard, the upper limit of the write magnetic field intensity by the thin film magnetic head is nearly determined by the saturation magnetic flux density of the soft magnetic material that constitutes the magnetic core within the head. Accordingly, writing becomes impossible when the anisotropic magnetic field of the magnetic recording medium exceeds the tolerance determined from the upper limit of the write magnetic field intensity. Currently, one method to resolve the problem of this type of thermal stability proposes a so-called thermally-assisted magnetic recording method in which writing is performed by reducing the anisotropic magnetic field through adding heat to the magnetic recording medium immediately prior to applying the write magnetic field while using a magnetic material with a large Ku.

A commonly known method for such thermally-assisted magnetic recording uses a near-field probe, a so-called plasmon antenna, that is a piece of metal that generates a near-field from plasmon excited by an irradiated laser beam. For example, a plasmon-generator is disclosed in the specification of U.S. Pat. No. 6,768,556 that provides a cone shaped metal scatterer formed on a substrate, and a film, which is dielectric or the like, formed around the periphery of the scatterer.

Further, a configuration is disclosed in U.S. Patent Publication No. 2004/081031 A1 that forms a plasmon-generator in a position to contact the main magnetic pole of a perpendicular magnetic recording head so that the irradiated surface is perpendicular to the magnetic recording medium. Furthermore, technology is disclosed in U.S. Patent Publication No. 2003/066944 A1 that attempts irradiation of a stronger near-field onto the magnetic recording medium by making a priority for the tip of the plasmon antenna to be closer to the magnetic recording medium.

The inventors of the present application are proceeding with the development of a further improved thermally-assisted magnetic recording head by using near-field irradiation in pursuit of the limit of magnetic recording potential.

When performing thermally-assisted recording with a magnetic recording head using irradiation of a near-field, a laser generating device is mounted on the magnetic recording head as a light emitting element, and the laser light emitted from the laser generating device is introduced into an optical waveguide and requires guidance to the plasmon antenna which exists in a position in close proximity facing the magnetic recording medium.

A spot size converter is used at such time to effectively taper the spot size of the laser light entering the optical waveguide. However, the size of the magnetic recording head itself is extremely small, so that a design that reduces the size of the spot size converter by shortening the waveguide length to effectively taper light to be suitable for use in such a corresponding size is desired to provide a spot size converter with favorable spot size conversion efficiency even with a reduced size. Further, with a use of a thin film technology, an optical waveguide having a spot size converter that is formed with a high productivity, even though its size remains minute (or fine), is desired. For example, it is desired to have a spot size converter in which its minute pattern forming film rarely breaks.

SUMMARY OF THE INVENTION

In order to solve above issues, the present invention is an optical waveguide that is structured with a core that is a waveguide where light is propagated, a clad that surrounds the periphery thereof, and a spot size converter member; wherein a refractive index of a material composing the core is larger than another refractive index of a material composing the clad, wherein the core provides a light incidence plane end surface that is one side where light enters and a light emitting plane end surface where light propagated in the waveguide is emitted, and the light incidence plane end surface at which the light enters, a taper portion that is a plate-like body of a nearly trapezoidal shape when viewed from a level plane and where a rectangular cross-section gradually decreases when advancing internally from the light incidence plane end surface, a waveguide core part that is linked to a minimum cross-section part of the taper portion and that extends to a targeted waveguide position while maintaining the cross-sectional area of the minimum cross section part for mainly propagating the light in a single mode; and the taper portion that is the plate-like body of nearly a trapezoidal shape provides a first plane and a second plane of nearly a trapezoidal shape, and on both of these planes, a first triangular plate-like spot size converter member and a second triangular plate-like spot size converter member composed of the same material as the core material are respectively arranged and formed in a substantially symmetrical structure.

A preferred mode of the optical waveguide of the present invention is structured so that a condition, t1:t2=7:3~3:7, is satisfied, where a thickness of the first triangular plate-like spot size converter member is t1 and a thickness of the second triangular plate-like spot size converter member is t2.

A preferred mode of the optical waveguide of the present invention is structured so that a condition, t1:t2=6:4~4:6, is satisfied, where a thickness of the first triangular plate-like spot size converter member is t1 and a thickness of the second triangular plate-like spot size converter member is t2.

A preferred mode of the optical waveguide of the present invention is structured so that The optical waveguide of claim 1, wherein a condition, L1:L2=10:6~6:10, is satisfied, where a length of the first triangular plate-like spot size converter member is L1 and a length of the second triangular plate-like spot size converter member is L2.

A preferred mode of the optical waveguide of the present invention is structured so that a condition, L1:L2=10:8~8:10, is satisfied, where a length of the first triangular plate-like spot size converter member is L1 and a length of the second triangular plate-like spot size converter member is L2.

A preferred mode of the optical waveguide of the present invention is structured so that a width W0 of the light incidence plane end surface of the taper portion that is the nearly triangular plate-like body, a width W1 of the light incidence plane end surface of the first triangular plate-like spot size converter member, and a width W2 of the light incidence plane end surface of the second triangular plate-like spot size converter member have the same size and the widths are in a range of 0.1~10 μm.

A preferred mode of the optical waveguide of the present invention is structured so that a total thickness sum of the thickness t0 of the light incidence plane end surface of the taper portion that is the nearly triangular plate-like body, a thickness t1 of the light incidence plane end surface of the first triangular plate-like spot size converter member, and a thickness t2 of the light incidence plane end surface of the second triangular plate-like spot size converter member is in a range of 0.1~10 μm.

A preferred mode of the optical waveguide of the present invention is structured so that a length L0 (depth) of the taper portion that is the nearly triangular plate-like body is in a range of 5~500 μm, and a width W0min of a minimum cross-section part that is the rear end of the taper portion, is in a range of 0.01~2 μm.

A preferred mode of the optical waveguide of the present invention is structured so that a condition, θ1>θ0 and θ2>θ0, is satisfied, when comparing a taper angle θ0 of the taper portion that is the nearly triangular plate-like body, a taper angle θ1 of the first triangular plate-like spot size converter member, and a taper angle θ2 of the second triangular plate-like spot size converter member.

A preferred mode of the optical waveguide of the present invention is structured so that depth tip positions of the first and second triangular plate-like spot size converter members are respectively either in the same position as the minimum cross-section part that is the rear end of the taper portion, or in a range of −92 ~+150 μm with respect to a position of a minimum cross-section part that is the rear end of the taper portion as the basis.

A thermally-assisted magnetic head of the present invention is structured so that a thermally-assisted magnetic recording head, includes: a magnetic pole where a writing magnetic field is generated from an end surface of an air baring surface side; the waveguide of claim 1 where light for exciting plasmon is propagated; and a plasmon-generator where the light is coupled in a plasmon mode.

The optical waveguide of the present invention, on account of its ability to apply phase resonance of a wavelength, can promote shortening of the waveguide length and contrive to reduce the size of the optical waveguide itself. Further, an optical waveguide having excellent spot size conversion efficiency can be obtained even in a reduced size.

DETAILED DESCRIPTION OF THE INVENTION

The best mode of the optical waveguide for implementing the present invention is described in details hereafter.

An optical waveguide of the present invention is structured by having a core that is the waveguide where light is propagated, a clad that surrounds the periphery thereof, and a spot size converter (may also be called a spot size converter member). Further, a near-field generator to be described hereafter is configured of a plasmon-generator and an optical waveguide. The propagative edge (Katana) is configured as a part of the plasmon-generator.

Figure 1:
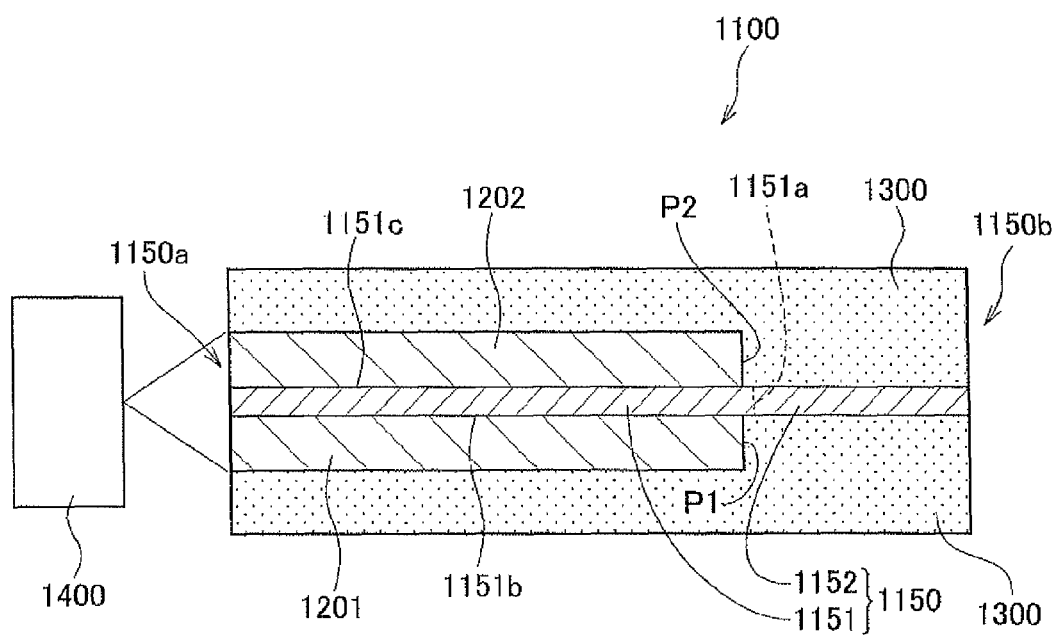
FIG. 1 illustrates a cross sectional view in frame format of the optical waveguide of the present invention where a light beam emitted from the light emitting device is irradiated.
Figure 1:
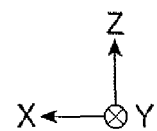
Figure 2:
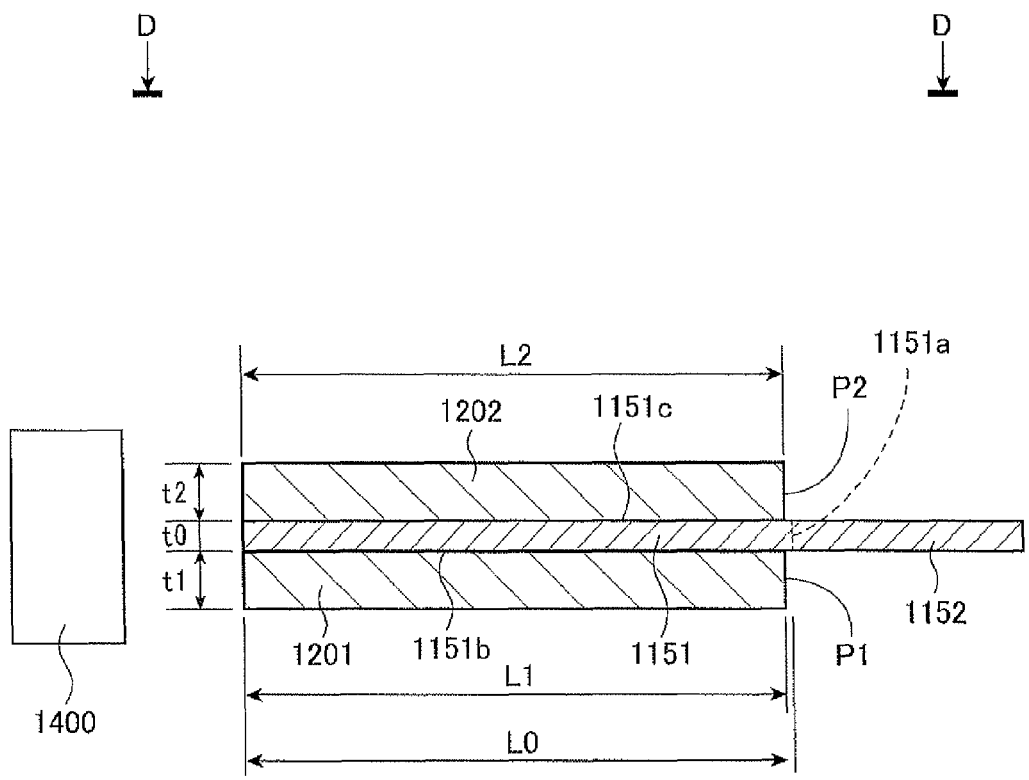
FIG. 2 is a cross sectional view describing the optical waveguide illustrated in FIG. 1 without a clad.

FIG. 1 is a cross sectional view in frame format of the optical waveguide 1100 to introduce a light beam that is emitted from a light emitting device such as a laser diode 1400, and FIG. 2 is a cross sectional view describing a state without the clad 1300 from the optical waveguide 1100 illustrated in FIG. 1 in order to clearly illustrate the principal part of the present invention. In addition, material selection for the core and clad is performed so that the refractive index of the material composing the core is larger than the refractive index of the material composing the clad.

Figure 3:
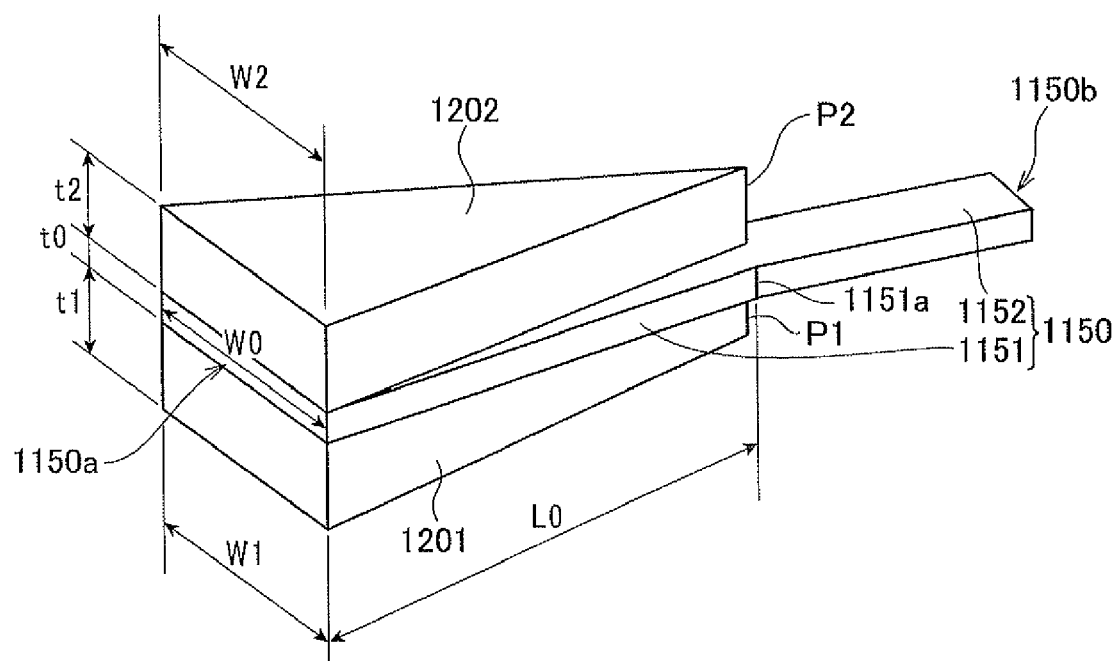
FIG. 3 illustrates a perspective view of the principal part of the optical waveguide illustrated in FIG. 2.
Figure 3:
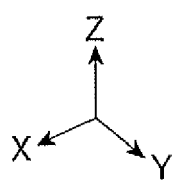

Furthermore, FIG. 3 is described as the perspective view of the principal part of the optical waveguide illustrated in FIG. 2.

Figure 4:
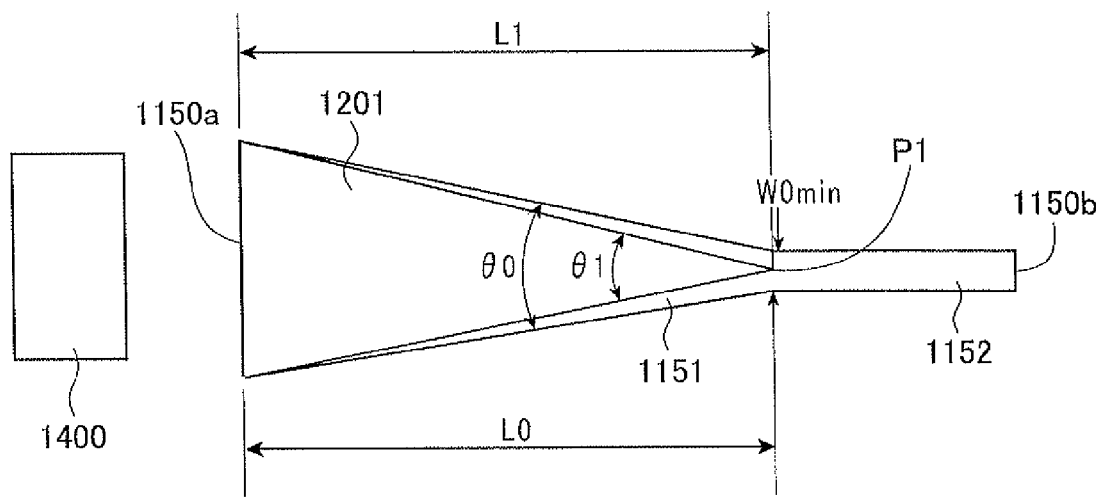
FIG. 4 is a plane view of the optical waveguide of the present invention illustrated in FIG. 2 as viewed from the lower direction (C-C arrow view).
Figure 5:
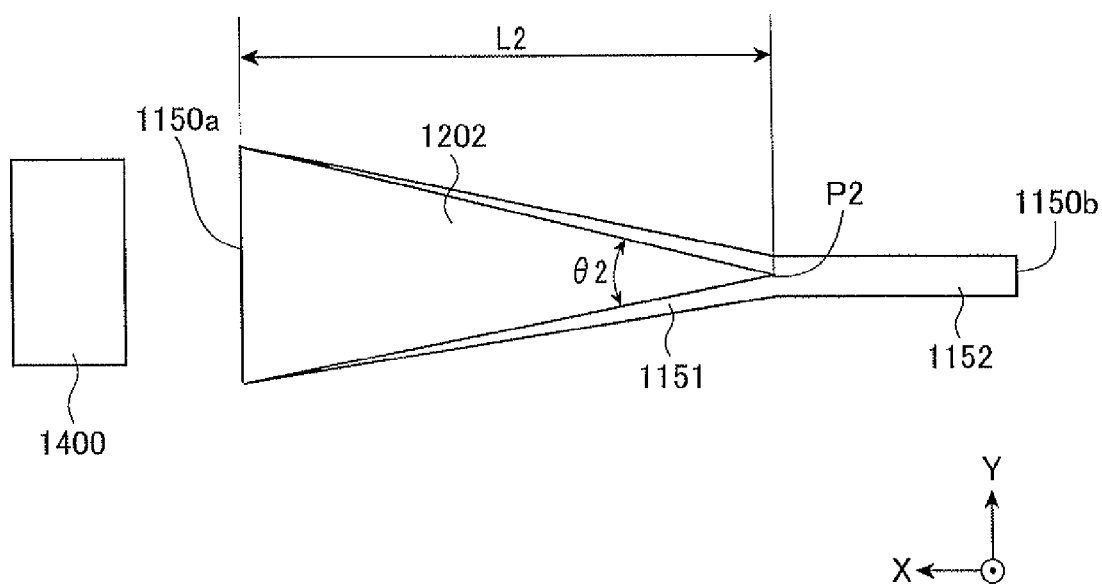
FIG. 5 is a plane view of the optical waveguide of the present invention illustrated in FIG. 2 as viewed from the upper direction (D-D arrow view).

Moreover, FIG. 4 is a plane view of the optical waveguide of the present invention illustrated in FIG. 2 as viewed from the lower direction (C-C arrow view), and FIG. 5 is a plane view of the optical waveguide of the present invention illustrated in FIG. 2 as viewed from the upper direction (D-D arrow view).

As illustrated in FIG. 1, the optical waveguide 1100 of the present invention is structured having the core 1150 that is the waveguide main body being the principal part to introduce light, and the clad 1300 that surrounds the periphery thereof. Further, the first triangular plate-like spot size converter member 1201 and second triangular plate-like spot size converter member 1202 composed of the same material as the core material are arranged and formed in a substantially symmetrical structure at the side of the core 1150 where light enters.

The core 1150 is the waveguide core 1150.

The optical waveguide 1100 provides a light incidence plane end surface 1150a, which is one side where light enters, and a light emitting plane end surface 1150b, where light is emitted.

The core 1150 is structured, as illustrated in FIG. 3, having a taper portion 1151 and a waveguide core part 1152. The taper portion 1151 is a plate-like body with a nearly trapezoidal elongated shape when viewed from a level plane (X-Y level) and where a rectangular cross-section gradually decreases when advancing internally (−X direction) from the light incidence plane end surface 1150a, which has a rectangular end surface and which is the one side where central light enters. The waveguide core part 1152 is linked to the minimum cross section part 1151a of the taper portion 1151 and that extends to the targeted waveguide position while substantially maintaining the cross section area of the minimum cross section part 1151a. The waveguide mode in the waveguide core part 1152 is mainly a single mode. The single mode indicates that there is one mode for propagating light.

FIG. 4 and FIG. 5 are also references for the configuration of the taper portion 1151, which has a plate-like body with a nearly trapezoidal shape. The taper portion 1151 is the taper portion 1151 of the core 1150.

As illustrated in FIG. 1 through FIG. 5, the taper portion 1151, that is a nearly trapezoidal plate-like body, provides a first plane 1151b (X-Y surface) as well as a second plane 1151c (X-Y surface) in a nearly trapezoidal shape (specifically see FIG. 1 and FIG. 2), and a first triangular plate-like spot size converter member 1201 and a second triangular plate-like spot size converter member 1202 are respectively arranged and formed in a substantially symmetrical structure at both these planes 1151b and 1151c. Since the material is composed of the same material as the core, the first triangular plate-like spot size converter member 1201 and the second triangular plate-like spot size converter member 1202 may be considered as a part of the core structure.

Herein, the phrase "arranged and formed in a substantially symmetrical structure" refers to, from a forming perspective, that the first triangular plate-like spot size converter member 1201 and the second triangular plate-like spot size converter member 1202 are arranged and formed in a mirror image relationship centering on the taper portion 1151 of a nearly trapezoidal plate-like body. It also refers to the arrangement, from an efficiency perspective, in which a waveguide efficiency (optical power efficiency) of 35% or greater is obtained by providing the first triangular plate-like spot size converter member 1201 and the second triangular plate-like spot size converter member 1202. The reason for the 35% or greater is that it has been confirmed that achieving an optical power efficiency of 35% or greater is difficult regardless of how long the taper is made when only providing one of either the first triangular plate-like spot size converter member 1201 or the second triangular plate-like spot size converter member 1202. In addition, the optical power efficiency is defined as (propagative efficiency)×(coupling efficiency).

Moreover, since the wording an "image mirror relationship" is ambiguous concerning what extent can be considered a mirror image condition, it is preferred to follow the definition from an efficiency perspective. With the optical waveguide 1100 of the present invention, in order to arrange and form the first triangular plate-like spot size converter member 1201 and the second triangular plate-like spot size converter member 1202 in a substantially symmetrical structure, when the thickness of the first triangular plate-like spot size converter member 1201 is t1 and the thickness of the second triangular plate-like spot size converter member 1202 is t2 (see FIG. 2 and FIG. 3), t1/t2 that is the comparison value is preferred to be set in a range of t1/t2=7/3~3/7. A more preferred range is t1/t2=6/4~4/6.

When the t1/t2 ratio is outside the range between 7/3 and 3/7, obtaining the optical power efficiency of 35% or greater becomes difficult. In addition, thicknesses t1 and t2 are normally approximately between 0.1 and 10 μM.

In addition, when the thicknesses t1 and t2 are not formed with a uniform thickness in the length direction (waveguide direction), for instance, when a distribution of the film thickness either gradually decreases or increases in the length direction (waveguide direction), the average thickness of these distributions is calculated to be t1 and t2.

Further, in order to arrange and form the spot size converter member 1201 and the spot size converter member 1202 in a substantially symmetrical structure, when the length of the first triangular plate-like spot size converter member 1201 is L1 and the length of the second triangular plate-like spot size converter member 1202 is L2 (see FIG. 2, FIG. 4 and FIG. 5), L1/L2 that is the comparison value thereof is preferred to be set in the range L1/L2=10/6~6/10. A more preferred range is L1/L2=10/8~8/10.

When the L1/L2 ratio is outside the range between 10/6 and 6/10, obtaining the optical power efficiency of 35% or greater becomes difficult.

Especially, by arranging and forming the first triangular plate-like spot size converter member 1201 and the second triangular plate-like spot size converter member 1202 in a substantially symmetrical structure as described in the present application, the length of the spot size converter members 1201 and 1202 are shortened (for instance, approximately between 5 and 500 μm), and the spot size can be efficiently tapered.

Further, with the optical waveguide of the present invention, as illustrated in FIG. 3, the width W0 in the light incidence plane end surface of the taper portion 1151 that is nearly a triangular plate-like body, the width W1 in the light incidence plane end surface of the first triangular plate-like spot size converter member 1201, and the width W2 in the light incidence plane end surface of the second triangular plate-like spot size converter member 1202 are set to be the same size. Each of these widths is set within a range between 0.1 and 10 μm, and more preferably is set between 0.2 and 4 μm. When the size of each of these widths exceeds the upper limit, a problem occurs in that the waveguide efficiency significantly decreases. On the other hand, when the size of each of these widths is less than the lower limit, a problem occurs in that the coupling efficiency significantly decreases with the light beam emitted from the light emitting device. In addition, the first triangular plate-like spot size converter member 1201 and the second triangular plate-like spot size converter member 1202 respectively are preferably isosceles triangles where the widths W1 and W2 are the bases in the light incidence plane end surface. However, the edge portion of the isosceles is not limited to a straight line in a strict sense, even a curved line that is curved inward or outward may be acceptable.

Further, in the present invention, the sum of the thicknesses (t0+t1+t2) of the thickness of t0 of the optical incidence plane end surface of the taper portion 1151 that is nearly a triangular plate-like body, the thickness t1 of the first triangular plate-like spot size converter member 1201, and the thickness t2 of the second triangular plate-like spot size converter member 1202 is in a range between 0.1 and 10 μm, and more preferably between 0.2 and 4 μm. When the value of the sum thickness exceeds the upper limit, a problem occurs in that the waveguide efficiency significantly decreases.

On the other hand, when the value of this sum is less than the lower limit, a problem occurs in that the coupling efficiency significantly decreases with the light beam emitted from the light emitting device.

As illustrated in FIG. 4, the length L0 (depth) of the nearly triangular plate-like taper portion 1151 is in a range between 5 and 500 μm, more preferably between 10 and 250 μm. Furthermore, the width W0min of the minimum cross section part 1151a that is the rear end of the taper portion 1151 is in a range between 0.01 and 2 μm and more preferably between 0.05 and 1 μm.

Moreover, in the present invention, a depth acute angle front end position P1 of the first triangular plate-like spot size converter member 1201 and a depth acute angle front end position P2 of the second triangular plate-like spot size converter member 1202 are set as described below. For the first preferred embodiment, each of these depth acute angle front end position P1 and depth acute angle front end position P2 is the same position as the minimum cross section part 1151a that is the rear end of the taper portion 1151. For the second preferred embodiment, each of these depth acute angle front end position P1 and the depth acute angle front end position P2 is set in a range between −200 μm and 333 μm, more preferably between −92 μm and 150 μm having the position of the minimum cross section part 1151a that is the rear end of the taper portion as the basis. Minus indicates a distance towards the minus (negative) direction of the X axis.

According to such relationships, as illustrated in FIG. 4 and FIG. 5, the structure is made so as to maintain the relationship of θ1>θ2, and θ2>θ0 when comparing the taper angle θ0 of the taper portion 1151 that is the nearly triangular plate-like body, the taper angle θ1 of the first triangular plate-like spot size converter member 1201, and the taper angle θ2 of the second triangular plate-like spot size converter member 1202. In particular, θ1=θ2>θ0 is preferred.

The angles θ1, θ2, and θ0 are preferably as large as possible being based on the realization of high waveguide efficiency. The larger these angles, the shorter the lengths L1, L2 of the spot size converter members 1201, 1202, and the full length of the optical waveguide can be shorter while the elongated triangular plate-like spot size converter members 1201 and 1202 can be stably formed with thin-film technology. For instance, an elongated triangular plate-like spot size converter member with 4 μm of width and 150 μm of length easily collapses after forming a film, so the length of the spot size converter member is preferably as short as possible. Needless to say, this is a prerequisite to the realization of high optical power efficiency. The angles θ1, θ2, and θ0 according to the present invention are: θ1=0.010~45.0 deg., more preferably between 0.045 and 11.3 deg; θ2=0.010~45.0 deg., more preferably between 0.045 and 11.3 deg.; and θ0=0.010~45.0 deg., more preferably between 0.045 and 11.36 deg.

The length of the waveguide core part 1152, that is linked to the minimum cross-section part 1151a of the taper portion 1151 and that extends to the targeted waveguide position while substantially maintaining the cross-sectional area of the minimum cross section part 01152, is normally approximately between 0.001 and 250 μm.

According to the present invention, the first triangular plate-like spot size converter member and the second triangular plate-like spot size converter member composed of the same material as the core material are arranged and formed in a substantially symmetrical structure. Therefore, for instance, the length of the plate-like spot size converter member, which is necessary for, for instance, tapering a laser light, entered by multi-mode into a single mode light, can be shortened. It is considered that a phase plane in each mode within the waveguide can be matched by installing a pair of triangular plate-like spot size converter members to make a symmetrical structure.

The optical waveguide in the present invention described above has excellent conversion efficiency of the spot size, and reduction of the required length of the optical waveguide is possible, and therefore, this can apply to, for instance, a thermally-assisted magnetic recording head that is a minimally-sized magnetic recording head and that provides an optical waveguide, light transmission component, Si fine-wire waveguide, and the like.

Further, a layered structure of the optical waveguide as illustrated in FIG. 1 through FIG. 5 can be layered using thin-film manufacturing technology such as sputtering, milling, RIE, and photoresist.

A suitable example of the thermally-assisted magnetic recording head where the optical waveguide of the present invention is suitably applied is hereafter described. However, the structure of the thermally-assisted magnetic recording head itself is not limited to the description given below.

(Description of Thermally-Assisted Magnetic Recording Head)

Prior to describing the thermally-assisted magnetic recording head, definitions of the terms used in the present specification will be given. For the layered structure or element structure formed on the element formation surface of the slider substrate of the magnetic recording head, when viewed from the standard layer or element, the substrate side is "down (downward)," and the opposite side thereof is "up (upward)." Further, "X, Y, and Z directions" are designated in the drawings as necessary for the embodiment of the magnetic head. Here, the Z direction corresponds to the aforementioned up and down directions, the +Z side corresponds to the trailing side, and the −Z side corresponds to the reading side. The Y direction is the track width direction, and the X direction is the height direction. Further, the "side surface" of the waveguide provided within the corresponding magnetic head in the description of the magnetic recording head indicates an end surface other than an end surface orthogonal to the propagation direction (−X direction) of the light which propagates in the waveguide from the end surfaces which surround the waveguide. Therefore, the "upper surface" and "lower surface" of the waveguide are also the "side surface" in the description of the magnetic recording head, and the "side surface" is the plane which enables complete reflection of propagated light within the waveguide that corresponds to the core.

Figure 6:
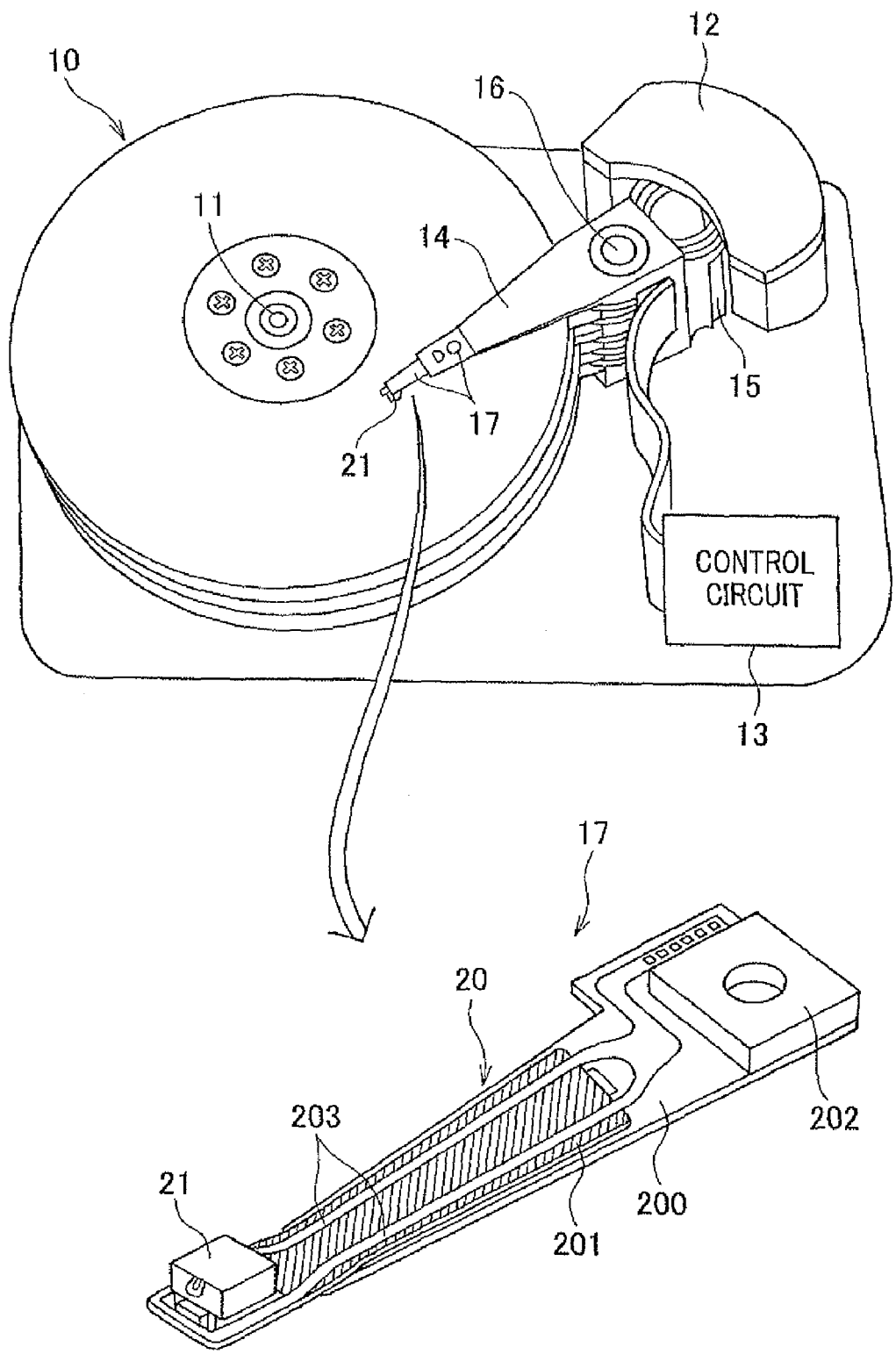
FIG. 6 is a perspective view schematically illustrating the structure of the principal part of one embodiment of a magnetic recording device and HGA where the optical waveguide of the present invention can be applied.

FIG. 6 is a perspective view schematically illustrating the structure of the essential components in one embodiment of the magnetic recording device and HGA (head gimbal assembly). Here, the perspective view of the HGA illustrates up as the side facing the magnetic recording medium surface of the HGA.

The magnetic disk device, as the magnetic recording device indicated in FIG. 6, rotates around the rotational axis of the spindle motor 11, and provides a plurality of magnetic disks 10 as the magnetic recording medium, an assembly carriage device 12 that provides a plurality of drive arms 14, a head gimbal assembly (HGA) 17 that provides a thermally-assisted magnetic recording head 21 that is a thin film magnetic head attached to the tip of each drive arm 14, and a record reproduction and light emission control circuit 13 that controls the writing and reading operation of the thermally-assisted magnetic recording head 21, and that is for controlling the light emission operation of the laser diode which is the light source to generate the laser light for use in the thermally-assisted magnetic recording to be described hereafter.

The magnetic disk 10, in the present embodiment, is for perpendicular magnetic recording, and has a structure in which a soft magnetic under layer, an interim layer, and a magnetic recording layer (perpendicular magnetized layer) are layered in that order onto the disk substrate. The assembly carriage device 12 is a device for determining the position of the thermally-assisted magnetic recording head 21 on the track aligned with recording bits formed in the magnetic recording layer of the magnetic disk 10. Within the assembly carriage device 12, the drive arms 14 are stacked in a direction along the pivot bearing axis 16 and are configured with the ability for angular swing centrally around the axis 16 by a voice coil motor (VCM) 15.

Moreover, the structure of the magnetic disk device that relates to the present invention is not limited to the structure described above. For example, the magnetic disk 10, drive arms 14, HGA 17, and thermally-assisted magnetic recording head 21, may also be a unit.

In addition, according to FIG. 6, with the HGA 17, the suspension 20 is structured to provide a load beam 200, a flexure 201 that is fixed to the load beam 200 having elasticity, and a base plate 202 prepared at the base of the load beam 200. Further, above the flexure 201, a wiring member 203 is provided and is configured with a connection pad electrically connected to the lead conductive body and both ends thereof. The thermally-assisted magnetic recording head 21 is at the tip end portion of the suspension 20 and is fixed to the flexure 201 so as to face the surface of each magnetic disk 10 at a predetermined spacing (flying height). In addition, one end of the wiring member 203 is electrically connected to the terminal electrode of the thermally-assisted magnetic recording head 21.

Moreover, the structure of the suspension 20 also is not limited to the structure described above. An IC chip for driving the head, although not illustrated in the drawing, may also be mounted midway on the suspension 20.

Figure 7:
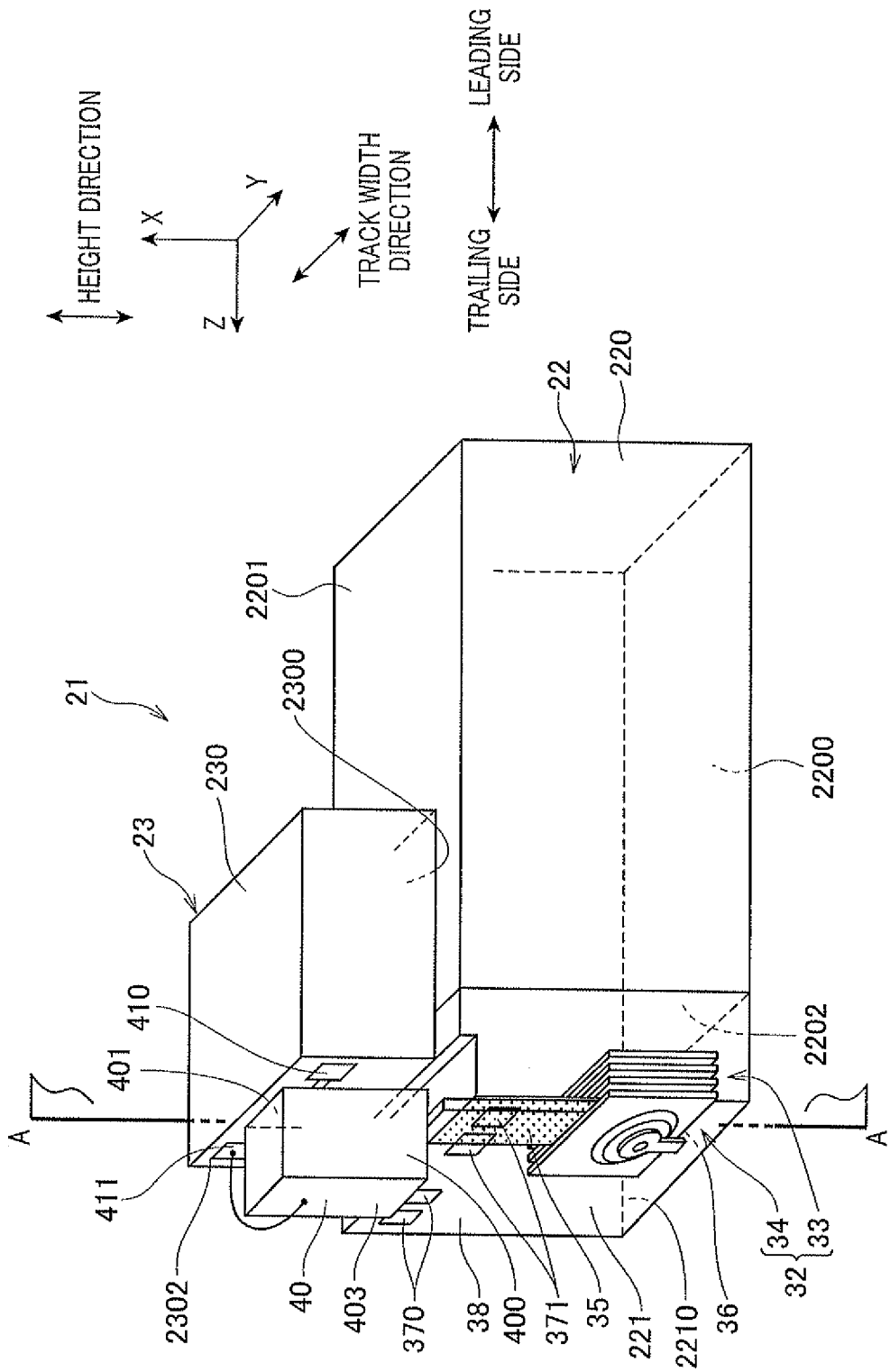
FIG. 7 is a perspective view schematically illustrating the structure of the principal part of the thermally-assisted magnetic recoding head where the optical waveguide of the present invention can be applied.

FIG. 7 is a perspective view illustrating one embodiment of the thermally-assisted magnetic recording head 21 according to the present invention.

The thermally-assisted magnetic recording head 21, as illustrated in FIG. 7, provides a slider 22 and a light source unit 23.

The slider 22 is formed from AlTiC ($Al_2O_3$—TiC) or the like, and provides a slider substrate 220 having an air bearing surface (ABS) 2200 that is a medium opposing surface processed to obtain the appropriate flying height, and a head unit 221 formed on the element forming surface 2202 orthogonal to the ABS 2200.

Further, the light source unit 23 provides a unit substrate 230 having an adhesion surface 2300 and is formed from AlTiC ($Al_2O_3$—TiC) or the like, and a laser diode 40 as the light source prepared at a light source joining surface 2302 orthogonal to the adhesion surface 2300. Here, the slider 22 and the light source unit 23 are mutually joined together by bonding the rear surface 2201 of the slider substrate 220 with the adhesion surface 2300 of the unit substrate 230.

Here, the rear surface 2201 of the slider substrate 220 is the end surface of the opposing side to the ABS 2200 of the slider substrate 220. Moreover, the thermally-assisted magnetic recording head 21 may also be formed by directly mounting the laser diode 40 to the slider 22 without using the light source unit 23.

The head unit 221 formed on the element formation surface 2202 of the slider substrate 220 of the slider 22 provides a head element 32, a waveguide 35, a plasmon-generator 36, an overcoat layer 38, a pair of terminal electrodes 370, and a pair of terminal electrodes 371. Herein, the head element 32 is structured by providing both the MR element 33 for reading data from the magnetic disk and the electromagnetic conversion element 34 for writing data to the magnetic disk. The waveguide 35 is configured to guide laser light from the laser diode 40 provided by the light source unit 23 to the air bearing surface side. The plasmon-generator 36 is configured by the waveguide 35 together with the near-field generator. The overcoat layer 38 is formed on the element formation surface 2202 so as to cover the MR element 33, the electromagnetic conversion element 34, the waveguide 35, and the plasmon-generator 36. The pair of the terminal electrodes 370 is electrically connected to the MR element 33 and is exposed to the upper surface of the overcoat layer 38. The pair of the terminal electrodes 371 is electrically connected to the electromagnetic conversion element 34 and is exposed to the upper surface of the overcoat layer 38 in the same manner. The near-field generator is configured with the plasmon-generator and the waveguide.

Here, the waveguide 35 provides the same structure as the spot size converter 1100 and the first and second triangular plate-like spot size converter members 1201, 1202 described by using FIG. 1~FIG. 5 above and is the same. The waveguide 35 may not appear to be of the same embodiment as the spot converter illustrated in FIG. 1~FIG. 5, but it is the same.

The terminal electrodes 370 and 371 are electrically connected to the connection pad of the wiring member 203 prepared at the flexure 201 (see FIG. 6).

The MR element 33 and one end of the electromagnetic conversion element 34 as well as the plasmon-generator 36 reaches to the head end surface 2210 that is the medium opposing surface of the head unit 221. Here, the head end surface 2210 and the ABS 2200 make up the medium opposing surface of the entire thermally-assisted magnetic recording head 21.

At the time of actual writing or reading, the thermally-assisted magnetic recording head 21 hydro-dynamically flies with a predetermined flying height above the rotating magnetic disk surface. At such time, the ends of the MR element 33 and the electromagnetic conversion element 34 face each other through an appropriate magnetic spacing with the surface of the magnetic recording layer of the magnetic disk.

In this state, the MR element 33 performs reading by sensing the data signal magnetic field from the magnetic recording layer, and the electromagnetic conversion element 34 performs writing by applying a data signal magnetic field to the magnetic recording layer. Here, at the time of writing, the laser light propagated via the waveguide 35 from the laser diode 40 of the light source unit 23, as will be described hereafter, couples with the plasmon-generator 36 in the surface plasmon mode and excites the surface plasmon to the plasmon-generator 36.

This surface plasmon propagates the propagative edge equipped on the plasmon-generator 36 to be described hereafter, toward the head end surface 221, and a near-field is generated at the end of the head end surface side 221 of the plasmon-generator 36. This near-field reaches the magnetic disk surface heating the magnetic recording layer portion of the magnetic disk, and thereby lowering an anisotropic magnetic field (coercive force) of such portion to a certain level for enabling a writing process. As a result, thermally-assisted magnetic recording is able to be performed.

Figure 8:
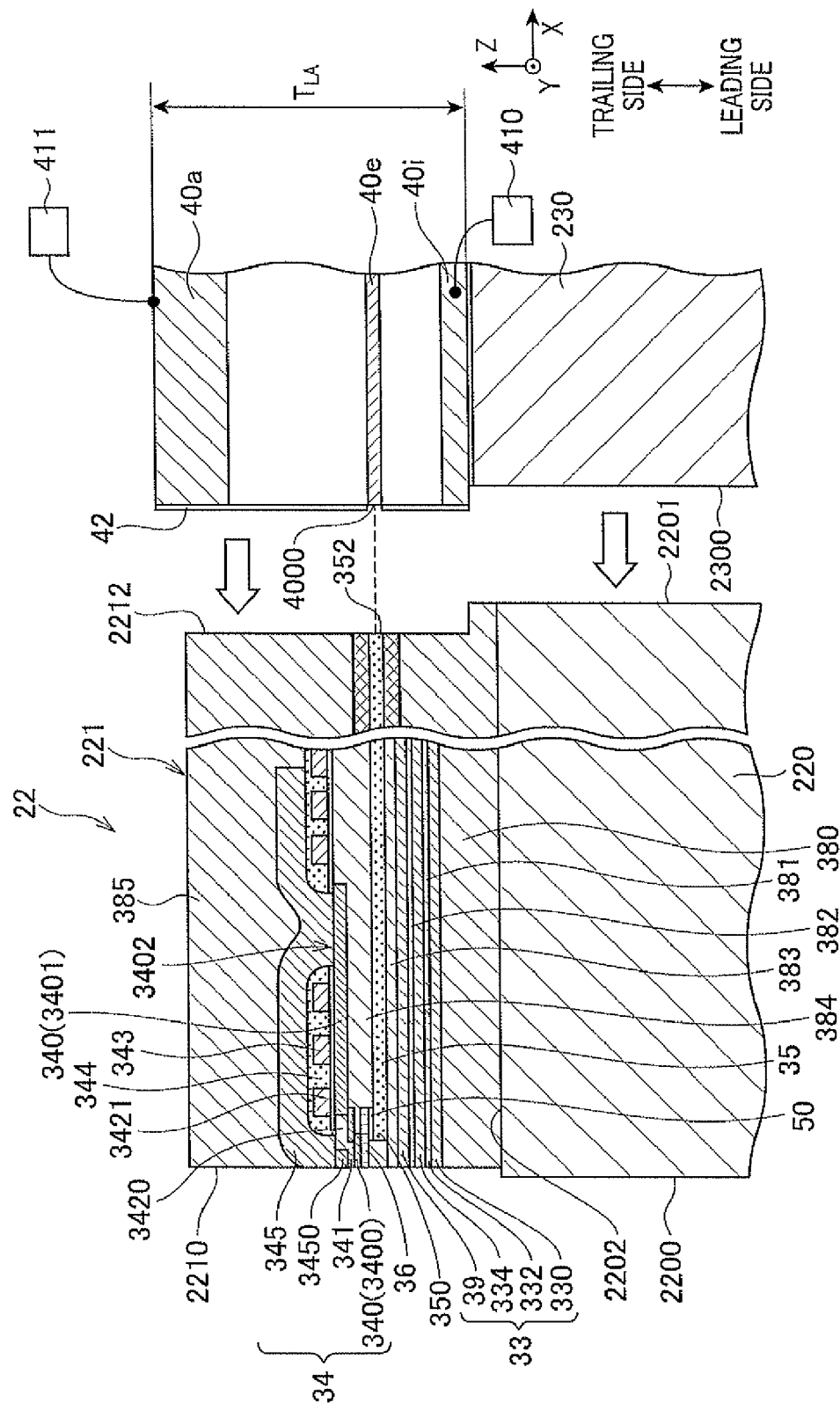
FIG. 8 is a cross-sectional view according to the A-A plane in FIG. 7 schematically illustrating the structure of the principal part of the thermally-assisted magnetic recording head.

FIG. 8 schematically illustrates the structure of the essential components of the thermally-assisted magnetic recording head 21 and is an A-A plane cross-sectional view of FIG. 7.

As illustrated in FIG. 8, the MR element 33 includes the MR multilayer 332 as well as the lower shield layer 330 and the upper shield layer 334, as a pair, placed in a position to sandwich the insulating layer 381 and the MR multilayer 332. The MR element 33 is formed on the insulating layer 380 that is formed on the element formation surface 2202. The upper and lower shield layers 334 and 330 prevent the MR multilayer 332 from receiving external magnetic fields that become noise.

The upper and lower shield layers 334 and 330 are magnetic layers formed by, for example, a frame plating method or a sputtering method, and are composed of for example, NiFe (Permalloy), FeSiAl (Sendust), CoFeNi, CoFe, FeN, FeZrN or CoZrTaCr, or the like, or a soft magnetic material of a multilayered film or the like of these materials. The thickness is, for example, approximately between 0.5~3 μm.

The MR multilayer 332 is a magnetic sensitive part that senses a signal magnetic field by using the MR effect and may be any of, for example, a CIP-GMR multilayer that utilizes a current in plane-giant magnetoresistive (CIP-GMR) effect, a CPP-GMR multilayer that utilizes a current perpendicular to plane-giant magnetoresistive (CPP-GMR) effect, or a TMR multilayer that utilizes a tunneling magnetoresistive (TMR) effect.

The MR multilayer 332 utilizing any type of the above MR effect can sense a signal magnetic field from a magnetic disk with high sensitivity. Moreover, when the MR multilayer 332 is a CPP-GMR multilayer or TMR multilayer, then the upper and lower shield layer 334 and 330 also performs the role of an electrode. Meanwhile, when the MR multilayer 332 is a CIP-GMR multilayer, then an insulating layer is provided between each of the upper and lower shield layers 334 and 330, and further, a magnetoresistive (MR) lead layer is provided that is electrically connected to the MR multilayer 332.

The MR multilayer 332 may be formed by various structures. For example, when the MR multilayer 332 is a TMR multilayer, the MR multilayer 332 may be formed with a structure by laminating the following layers: an antiferromagnetic layer with a thickness of about between 5~15 nm (nanometers) composed of, for example, IrMn, PtMn, NiMn, RuRhMn, or the like; a magnetization pinned layer in which two ferromagnetic layers composed of, for example, CoFe, or the like, sandwiches a nonferromagnetic metallic layer made of, such as Ru, and of which the magnetization direction is pinned by the antiferromagnetic layer; a tunnel barrier layer composed of a nonmagnetic dielectric material that is formed of a metallic film of a thickness of about between 0.5~1 nm and composed of, for example, Al, AlCu, or the like, the metallic film being oxidized either by natural oxidation or by oxygen directed into a vacuum device; a magnetization free layer that is structured from the two layered films of, for example, CoFe, or the like, with a thickness of about 1 nm and NiFe, or the like, with a thickness of about between 3~4 nm and that are ferromagnetic layers, and provides a tunnel exchange-coupling with the magnetization pinned layer through the tunnel barrier layer.

Similarly in FIG. 8, the electromagnetic conversion element 34 is for perpendicular magnetic recording, and provides a main magnetic pole layer 340, a gap layer 341, a write coil layer 343, a coil insulating layer 344, and a write shield layer 345.

The main magnetic pole layer 340 is formed on the insulating layer 384 composed of an insulating material such as $Al_2O_3$ (alumina), and is a waveguide for concentrating and guiding the magnetic flux that is generated by applying a writing electric current to the write coil layer 343 to the magnetic recording layer (perpendicular magnetization layer) of the magnetic disk for writing.

The main magnetic pole layer 340 has a structure in which the main magnetic pole 3400 and the main magnetic pole body part 3401 are sequentially laminated. Of these, the main magnetic pole 3400 reaches the head end surface 2210, and has a first main magnetic pole unit 3400a having a small width $W_P$ (see FIG. 10) in the track width direction, and a second main magnetic pole unit 3400b that is positioned above the first main magnetic pole unit 3400a and to the rear (+X side) of the first main magnetic pole unit 3400a.

In this manner, because the first main magnetic pole unit 3400a has a small $W_P$, a Minute writing magnetic field can be generated, thereby enabling a track width to be set to a minute value which corresponds to a high recording density.

The main magnetic pole 3400 is formed from a soft magnetic material having a higher saturation magnetic flux density than the main magnetic pole body part 3401, and is formed from a soft magnetic material, for example, FeNi, FeCo, FeCoNi, FeN, or FeZrN or the like, that are ferrous alloys in which Fe is the main component. The thickness of the main magnetic pole unit 3400a is, for example, between 0.1 and 0.8 μm.

The gap layer 341 forms a gap for magnetically separating the main magnetic pole layer 340 and the write shield layer 345 in the vicinity of the head end surface 300. The gap layer 341 is structured of a non magnetic insulating material such as $Al_2O_3$ (alumina), $SiO_2$ (silicon dioxide), AlN (nitrous aluminum) or diamond-like carbon (DLC), or a nonmagnetic conductive material such as Ru (ruthenium). The thickness of the gap layer 341 is determined by the gap between the main magnetic pole layer 340 and the write shield layer 345, with, for example, a thickness of about between 0.01~0.5 μm.

The write coil layer 343 is formed on the insulating layer 3421 composed of insulating material such as $Al_2O_3$ (alumina) such that a part of the write coil layer 343 is disposed at least between the main magnetic pole layer 340 and the write shield layer 345 in a single revolution, and which has a spiral structure around the back contact part 3402 as the center.

The write coil layer 343 is formed of a conductive material, for example, Cu or the like. The write coil insulating layer 344 covers the write coil layer 343 that is made of an insulating material, such as a heat application cured photoresist, accordingly insulating intermediate surfaces between the write coil layer 343 and the main magnetic pole layer 340 and between the write coil layer 343 and the write shield layer 345.

The write coil layer 343, although a single layer in the present embodiment, may also be two or more layers or a helical coil. Further, the number of revolutions (windings) is not limited to the number illustrated in FIG. 8, for example, but is preferably set to between 2 and 7 revolutions.

The write shield layer 345 reaches the head end surface 2210 and functions as the conductive magnetic path for the magnetic flux returned from the soft magnetic under layer provided beneath the magnetic recording layer (perpendicular magnetization layer) of the magnetic disk. The thickness of the write shield layer 345 is, for example, about between 0.5~5 µm. Further, with respect to the write shield layer 345, the portion facing the main magnetic pole layer 340 similarly reaches the head end surface 2210 to be a trailing shield 3450 to introduce the spread magnetic flux emitted from the main magnetic pole layer 340.

The trailing shield 3450, in the present embodiment, is flattened together with the insulating film 3420 and the main magnetic pole body part 3401, and has a width in the track width direction larger than not only the first main magnetic pole unit 3400a but also the main magnetic pole body part 3401. By providing this type of a trailing shield 3450, the magnetic field gradient becomes steeper between the end of the trailing shield 3450 and the first main magnetic pole unit 3400a. As a result, signal output jitter is smaller and the error rate at the time of reading can be reduced. Further, the write shield layer 345 is formed from soft magnetic material, and particularly, the trailing shield 3450 has a high saturation magnetic flux density and is formed from NiFe (Permalloy) or a ferrous alloy material or the like that is similar to the main magnetic pole 3400.

As similarly illustrated in FIG. 8, the waveguide 35 and the plasmon-generator 36 are provided between the MR element 33 and the electromagnetic conversion element 34, and provide the near-field generator that is the optical system within the head unit 221. Here, the waveguide 35 extends from the end surface 352 (synonymous with reference number 1150a in FIG. 1~FIG. 5) to the end surface 350 of the head end surface 2210 side, the end surface 352 is parallel to the element formation surface 2202 and reaches the head end surface 2212.

Further, a portion of the upper surface (side surface) of the waveguide 35 and a portion of the bottom surface of the plasmon-generator (including the propagative edge 360 (FIG. 9)) are mutually opposed at a predetermined spacing, and the portion sandwiched between these portions becomes the buffer portion 50 having a lower refractive index than the refractive index of the waveguide 35.

The buffer portion 50 functions for coupling the laser light that propagates through the waveguide 35 to the plasmon-generator 36 in the surface plasmon mode. Moreover, the buffer portion 50 may be a portion of the insulating layer 384 that is a portion of the overcoat layer 38, and may be a new layer provided separately from the insulating layer 384. The waveguide 35, plasmon-generator 36, and the buffer portion 50 are further described referring to FIG. 9.

In addition, in the present embodiment, an interelement shield layer 39 is provided between the MR element 33 and the electromagnetic conversion element 34 (waveguide 35), the interelement shield layer 39 being sandwiched by the insulating layers 382 and 383. This interelement shield layer 39 functions for shielding the MR element 33 from the magnetic field generated from the electromagnetic conversion element 34, and may be formed of the same soft magnetic material as the upper and lower shield layers 334 and 330.

Moreover, the interelement shield layer 39 is not essentially required and an embodiment that does not include the interelement shield layer 39 is also practical. Further, a bucking coil part may be formed between the interelement shield layer 39 and the waveguide 35.

The bucking coil part is configured to suppress a wide area adjacent tracks erasing (WATE) phenomenon that is an unnecessary writing operation and/or a deleting operation to the magnetic disk by generating a magnetic flux to neutralize the magnetic flux loop that starts at the electromagnetic conversion element 34 via the upper and lower shield layers 334 and 330 of the MR element 33.

Similarly as illustrated in FIG. 8, many materials may be used for the laser diode 40, which are commonly used for communications, optical system disk storage, and material analysis or the like. For example, these materials may include InP series, GaAs series, GaN series etc. A wavelength) $\lambda_1$ of the irradiated laser light can be set arbitrarily in the range of for example, 375 nm~1.7 µm.

Specifically, for example, an InGaAs P/InP quaternary mixed crystal system laser diode can be used, of which the possible wavelength area is between 1.2~1.67 µm. The laser diode 40 has a multilayered structure that includes an upper electrode 40a, an active layer 40e, and a lower electrode 40i. A reflecting layer composed of $SiO_2$, $Al_2O_3$ or the like for exciting the oscillation due to the total reflection is formed in front and behind the cleavage surface of the multilayered structure, and an opening is provided to the reflecting layer 42 in the position of the active layer 40e that includes the light emitting center 4000. Here, the thickness of the laser diode 40 can be, for example, between 60~200 µm.

In addition, a power source within the magnetic disk device can be used to drive the laser diode 40. In actuality, the magnetic disk device normally provides a power source of, for example, about 2V that is a sufficient voltage for the laser oscillation operation. Further, the power consumption of the laser diode 40 is, for example, about several tens of m Watt [mW], that can be sufficiently supplied from the power source in the magnetic disk device.

Actually, a predetermined voltage is applied by the power source between the terminal electrode 410 electrically connected to the lower electrode 40i and the terminal electrode 411 electrically connected to the upper electrode 40a. The laser light is irradiated from the opening that includes the light emitting center 4000 of the reflecting layer 42 by oscillating the laser diode 40.

Moreover, the laser diode 40 and the drive terminal electrodes 410 and 411 are not limited to the embodiment described above.

The light source unit 23 provides a unit substrate 230, and a laser diode 40 equipped to a light source installation surface 2302 of the unit substrate 230, a terminal electrode 410 electrically connected to an electrode that is the bottom surface 401 of the laser diode 40, and a terminal electrode 411 electrically connected to an electrode that is the top surface 403 of the laser diode 40. The terminal electrodes 410 and 411 are electrically connected to connection pads of the wiring member 203 equipped to the flexure 201 (see FIG. 6).

When a predetermined voltage is applied to the laser diode 40 through both of the electrodes 410 and 411, the laser light is irradiated from the light emitting center placed on the light emitting surface 400 of the laser diode 40. Here, in such a head structure illustrated in FIG. 8, it is preferred to set the oscillation direction of the electric field of the laser light generated by the laser diode 40 perpendicular (Z direction) to the lamination layer of the active layer 40e. In other words, the laser diode 40 is preferably a chip that generates TM mode polarization.

As described above, the thermally-assisted magnetic recording head 21 is configured by connecting the light source unit 23 and the slider 22. This connection allows the adhesion surface 2300 of the unit substrate 230 to join with the back surface 2201 of the slider substrate 220. At such time, the position of the unit substrate 230 and the slider substrate 220 are determined so that the laser light generated from the laser diode 40 just enters the end surface 352 that is an opposite side to the ABS 2200 of the waveguide 35.

Moreover, although the size of the slider 22 and the light unit 23 are discretionary, the slider may also be, for example, so-called a femto slider with a width of 700 μm in the track width direction (Y direction)×a height of 850 μm (Z direction)×a thickness of 230 μm (X direction). In this case, the light unit 23 may also be one size smaller than this, for example, with a width of 425 μm in the track width direction×a height of 300 μm×a thickness of 300 μm.

Figure 9:
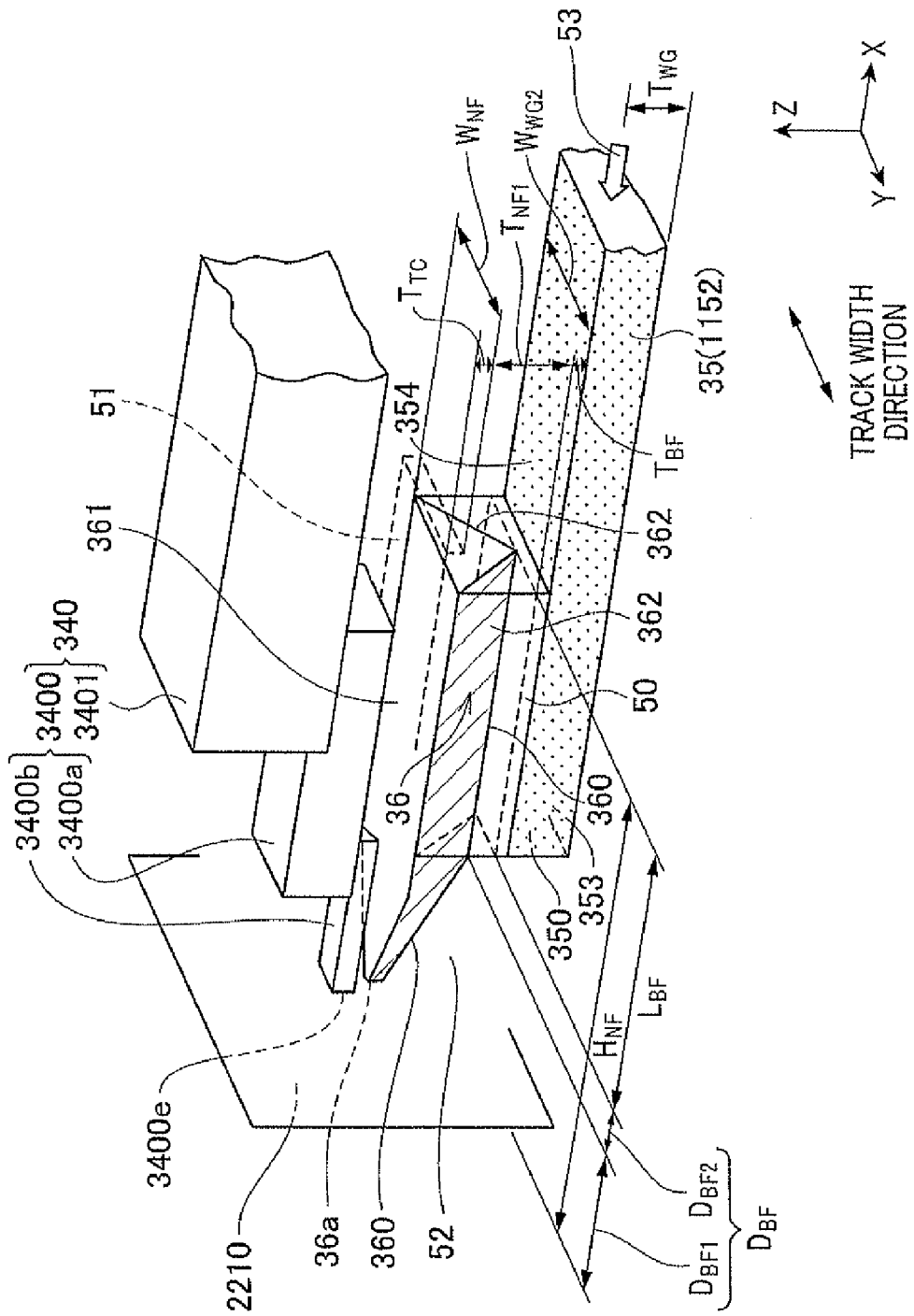
FIG. 9 is a perspective view schematically illustrating the structure of the waveguide, plasmon-generator, and main magnetic pole layer.

FIG. 9 is a perspective view schematically illustrating the structure of the waveguide 35, the plasmon-generator 36 and the main magnetic pole layer 340. In the same drawing, the head end surface 2210 is positioned to the left side, the head end surface including a portion from which the writing magnetic field and the near-field are irradiated toward the magnetic recording medium.

As illustrated in FIG. 9, the waveguide 35 is provided for propagating the laser light 53 for near-field generation, and the plasmon-generator 36 is provided which includes a propagative edge 360 through which the surface plasmon excited by the laser light 53 propagates. The location of the waveguide 35 partially illustrated in FIG. 9 corresponds to the waveguide core part 1152 in FIG. 1~FIG. 5.

Additionally, a portion sandwiched between a portion of the side surface 354 of the waveguide 350 and a portion of the bottom surface 362 that includes the propagative edge 360 of the plasmon-generator 36 facing the portion of the side surface 354 is the buffer portion 50. Namely, a portion of the propagative edge 360 is covered by the buffer portion 50.

The buffer portion 50 functions for coupling the laser light 53 to the plasmon-generator 36 in the surface plasmon mode. Here, side surfaces of the waveguide 35 indicate any surfaces among surfaces surrounding the waveguide 35 other than the end surface 350 of the head end surface 2210 that is perpendicular to the propagation direction (−X direction) of the laser light 53 and the other end surface of the opposing side thereof (not shown). These side surfaces are surfaces on which the laser light 53 propagated in the waveguide 35 corresponding to the core is completely reflected.

Moreover, in the present embodiment, a portion of the side surface 354 of the waveguide 35 contacts the buffer portion, and the side surface 354 is the upper surface of the waveguide 35. Further, the buffer portion 50 may also be a portion of the overcoat layer 38 (see FIG. 7), and may also be a new layer provided separately from the overcoat layer 38.

The plasmon-generator 36 further provides a near-field generation end surface 36a that reaches the head end surface 2210. The near-field generation end surface 36a is in the vicinity of the end surface 3400e that reaches the head end surface 2210 of the main magnetic pole 3400. Further, the propagative edge 360 extends from a portion covered by the buffer portion 50 where the portion couples with the laser light 53 in the surface plasmon mode, to the near-field generation end surface 36a, and functions for propagating the surface plasmon excited by the laser light 53 to the near-field generation end surface 36a.

Here, a portion of the propagative edge 360 of the head end surface 2210 side has, as it approaches toward the near-field generation end surface 36a, a liner shape or a curved shape elongating to approach toward the end surface 361 that is an opposite side of the propagate edge 360 of the plasmon-generator 36. Moreover, a corner of the propagative edge 360 may also be rounded in order to prevent the surface plasmon from escaping from the propagative edge 360. At this time, the curvature radius of the rounded corner is, for example, in the range of 5~500 nm.

Further, the plasmon-generator 36 in the present embodiment has a shape that tapers toward the near-field generation surface 36a in the height direction (Z direction) in the vicinity of the head end surface 2210.

Further, in the plasmon-generator 36, the cross-section according to the YZ plane has a triangular shape, and especially has a predetermined triangular shape in the vicinity of the head end surface 2210. As a result, the near-field generation end surface 36a, in the present embodiment, has a triangular shape of which a vertex is an end of the propagative edge 360 that reaches the end surface 36a (see FIG. 10). Here, when the surface plasmon that propagates through the propagative edge 360 reaches the near-field generation end surface 36a, the near-field is generated from the near-field generation end surface 36a.

The waveguide 35 and buffer portion 50 are provided at −Z side of the plasmon-generator 36 (bottom side of the drawing), namely, at the opposite side to the main magnetic pole 3400. As a result, the propagative edge 360 that is covered by the buffer portion 50 is also positioned on the opposite side to the main magnetic pole 3400. With such a structure, even if a distance between the end surface 3400e of the main magnetic pole 3400 that generates the write magnetic field and the near-field generation surface that generates the near-field is set sufficiently small (preferably 100 nm or less), the waveguide 35 can be sufficiently separated from the main magnetic pole 3400 and the main magnetic pole body part 3401. As a result, a situation can be avoided where a portion of the laser light 53 is absorbed by the main magnetic pole 3400 composed of metal and the main magnetic pole body part 3401, and the light amount that is expected to be converted to the near-field is reduced.

As illustrated in FIG. 9, the shape of the waveguide 35 (here synonymous with the waveguide core part 1152 in FIG. 1~FIG. 5) may be a rectangular cuboid. However, a width of a portion on the head end surface 2210 side in the track width direction (Y direction) may narrow. The width $W_{WG2}$ of the portion on the end surface 350 side in the track width direction (Y direction) can be, for example, between about 0.3~100 μm. The thickness $T_{WG}$ (Z direction) can be, for example, between 0.1~4 μm. The height (or length) (X direction) can be, for example, between about 10~300 μm.

Further, the side surfaces of the waveguide 35 or, in other words, the upper surface 354 and the lower surface 353, and both of the side surfaces 351 in the track width diction (Y direction) contact the overcoat layer 38, excluding the portion contacting the buffer portion 50 (see FIG. 7). Here, the waveguide 35 is configured from material having a higher refractive index $n_{WG}$ than the refractive index $n_{OC}$ of the structural material of the overcoat layer 38, and formed by, for example, a sputtering method or the like. Fore example, when the wavelength $\lambda_L$ of the laser light is 633 nm and the overcoat layer 38 is formed from $SiO_2$ (n=1.5), the waveguide 35 may be formed from $Al_2O_3$ (n=1.63). In addition, when the overcoat layer 38 is formed from $Al_2O_3$ (n=1.63), the waveguide 35 may be formed from $SiO_xN_Y$ (n=1.7~1.85), $Ta_2O_5$ (n=2.16), $Nb_2O_5$ (n=2.33), TiO (n=2.3~2.55) or $TiO_2$ (n=2.3~2.55). By configuring the waveguide with these types of materials, propagation loss of the laser light 53 can be maintained at a low level due to the favorable optical properties of the materials. In addition, while the waveguide 35 functions as the core, the overcoat layer 38 functions as the clad. Thereby, a complete reflection condition for every side surface is prepared. Accordingly, more of the laser light 53 reaches the buffer portion 50, which improves the propagation efficiency of the waveguide 35.

Here, the waveguide 35 has a multilayered structure of dielectric material, and in which the higher layer may have a larger refractive index a than a lower layer. For example, by sequentially laminating conductive material in which the value of the composition ratio of X and Y is suitably altered in $SiO_XN_Y$, this type of the multilayered structure can be realized. The number of the lamination layers can be, for example, between 8~12 layers.

As a result, when the laser light 53 is directly polarized in the Z direction, more laser light 53 (a larger amount of the laser light) can be propagated to the buffer portion 50 side in the Z direction. At this time, a desired propagation position can be realized in the Z direction of the laser light 53 by selecting the composition of each layer, the layer thickness, and layer count for this multilayered structure.

The plasmon-generator 36 is preferably formed from conductive material such as a metal, for example, Pd, Pt, Rh, Ir, Ru, Au, Ag, Cu or Al, or from alloys composed of a plurality of the elements. Further, the width $W_{NF}$ of the tracking width direction (Y direction) in the upper surface 361 of the plasmon-generator 36 can be set sufficiently smaller than the wavelength of the laser light 53, for example, between about 10~100 nm. The thickness $T_{NF1}$ (Z direction) can also be set sufficiently smaller than the wavelength of the laser light 53, for example, between about 10~100 nm. The length (height) (X direction) of the HNF can be set, for example, between about 8~6.0 μm.

The buffer portion 50 is formed from a dielectric material that has a refractive index $N_{BF}$ lower than the refractive index $N_{WG}$, of the waveguide 35. For example, when the wavelength $\lambda_L$, of the laser light is 633 nm and the waveguide 35 is formed from $Al_2O_3$ (n=1.63), the buffer portion 50 may be formed from $SiO_2$ (n=1.46).

In addition, when the waveguide 35 is formed from $Ta_2O_5$ (n=2.16), the buffer portion 50 may be formed from $SiO_2$ (n=1.46) or $Al_2O_3$ (n=1.63). In these cases, the buffer portion 50 can be a portion of the overcoat layer 38 (FIG. 7) that functions as the clad composed from $SiO_2$ (n=1.46) or $Al_2O_3$ (n=1.63).

Further, the length of the buffer portion 50 (in the X direction), in other words, the length $L_{BF}$ of the coupling portion between the waveguide 35 and the plasmon-generator 36, is preferably between 0.5~5 μm. The thickness $T_{BF}$ of the buffer portion 50 (in the Z direction) is preferably between 10~200 nm. The length $L_{BF}$ and the thickness $T_{BF}$ of the buffer portion 50 are critical parameters for achieving suitable excitation and propagation of the surface plasmon.

Further, the end of the head end surface 2210 side of the buffer portion 50 is separated from the head end surface 2210 by only the distance $D_{BF}$ in the X direction. A propagation distance of the surface plasmon is regulated by the distance $D_{BF}$.

Similarly as illustrated in FIG. 9, a thermal conductive layer 51 is preferably provided between the plasmon-generator 36 and the first main magnetic pole 3400a, and provided on the head end surface 2210 side. The thermal conductive layer 51 is formed from an insulating material, for example, AlN, SiC or DLC or the like, having a high thermal conductivity compared with the overcoat layer 38 (see FIG. 7). By providing this type of thermal conductive layer 51, a portion of the heat can be released to the main magnetic pole 3400 and the main magnetic pole body part 3401 through the thermal conductive layer 51. The heat is generated at the time when the plasmon-generator 36 generates the near-field.

In other words, the main magnetic pole 3400 and the main magnetic pole body part 3401 can be used as heat sinks. As a result, an excessive temperature increase of the plasmon-generator 36 can be suppressed, and an unnecessary protrusion in the near-field generation end surface 36a and a sharp drop in optical power efficiency in the plasmon-generator 36 can be avoided.

The thickness $T_{TC}$ of the thermal conductive layer 51 is set to a sufficiently small value of 100 nm or less that corresponds to a spacing $D_{N-P}$ (see FIG. 10) between the near-field generation end surface 36a above the head end surface 2210 and the end surface 3400e of the main magnetic pole 3400.

Additionally, the refractive index $n_{IN2}$ of the thermal conductive layer 51 is set to be the same or less than the refractive index $n_{IN1}$ of the insulating layer 52 that covers the propagative edge 360 of the plasmon-generator 36. In other words, the propagative edge 360 of the plasmon-generator 36 is prepared so as to be covered by a material having the same refractive index $n_{IN2}$ as the material covering the opposite side end surface 361 or by a material having a higher refractive index $n_{IN1}$.

Accordingly, the surface plasmon can be stably propagated on the propagative edge 360. In actuality, it is understood that refractive index $n_{IN1} \geq$ refractive index $n_{IN2} \times 1.5$ is preferred.

Similarly illustrated in FIG. 9, the main magnetic pole layer 340, as described above, includes the main magnetic pole 3400 and the main magnetic pole body part 3401. Of these, the main magnetic pole 3400 includes the first main magnetic pole unit 3400a having an end surface 3400c that reaches the head end surface 2210, and a second main magnetic pole unit 3400b where the end of the head end surface 2210 side overlaps onto a portion of the opposing side to the head end surface 2210 of the first main magnetic pole unit 3400a.

Further, the end of the head end surface 2210 side of the main magnetic pole body part 3401 overlaps onto a portion of the opposing side to the head end surface 2210 of the second main magnetic pole unit 3400b. In this manner, the portion of the head end surface 2210 of the main magnetic pole layer 340 inclines so as to approach the end of the head end surface 2210 side of the plasmon-generator in relation to the element formation surface 2202 (see FIG. 8) while facing toward the head end surface 2210. Accordingly, the main magnetic pole layer 340 is sufficiently separated from the waveguide 35, and the end surface 3400e of the main magnetic pole 3400 can be sufficiently closed to the near-field generation end surface 36a.

Figure 10:
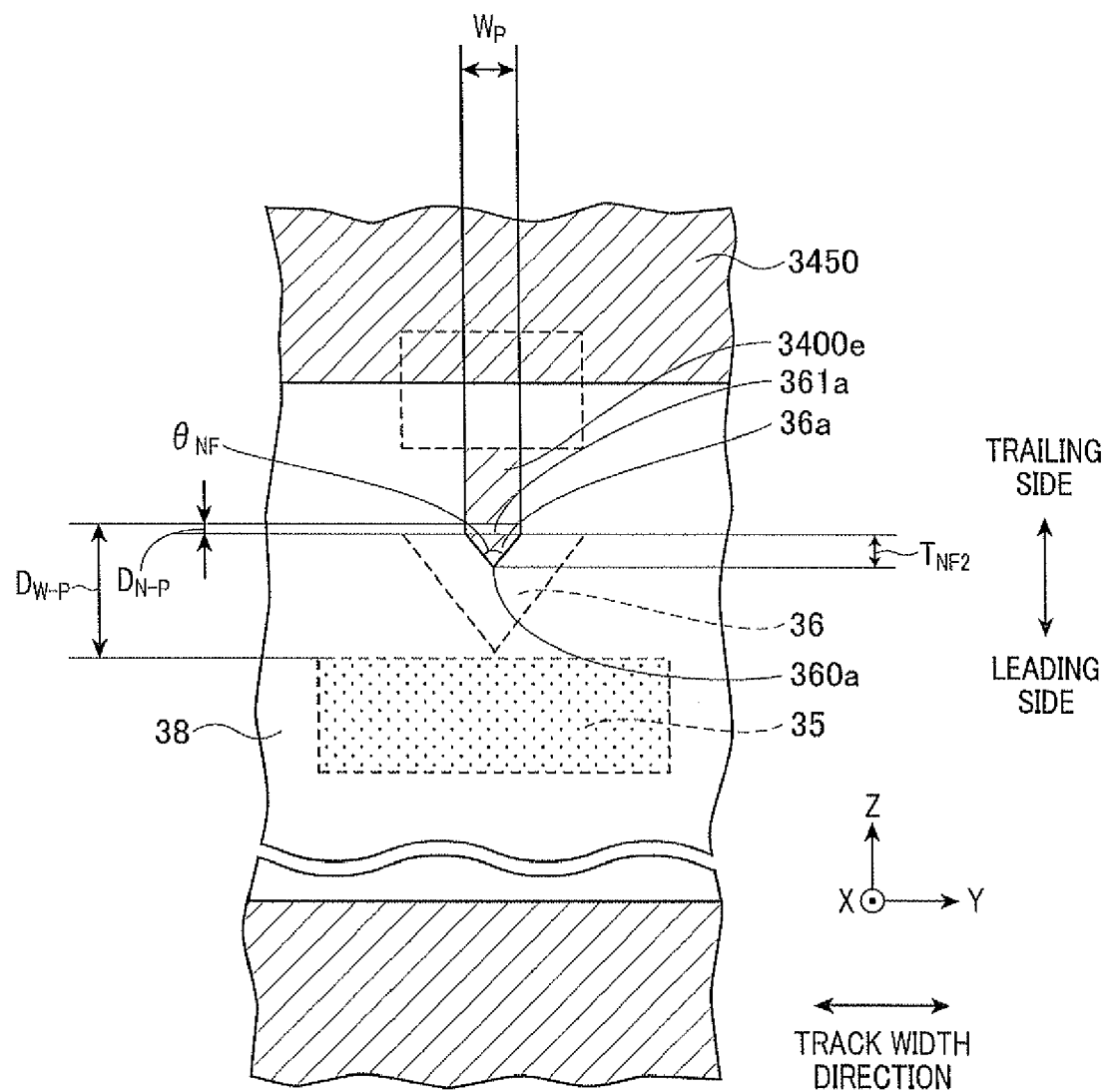
FIG. 10 is a-plan view illustrating the shape of the end surface of the plasmon-generator and the electromagnetic conversion device on the head part end surface.

FIG. 10 is a plan view illustrating the shape of the end surface on the head end surface 2210 of the electromagnetic conversion element 34 and the plasmon-generator 36.

As illustrated in FIG. 10, in the electromagnetic conversion element 34, the main magnetic pole 3400 (first main magnetic pole unit 3400a) and the write shield layer 345 (trailing shield 3450) reach the head end surface 2210. Of these, the shape of the end surface 3400e on the head end surface 2210 of the main magnetic pole 3400 is, for example, a rectangle, a square, or a trapezoid.

Herein, the width $W_p$ described above is the length of the edge of the leading side in the end surface 3400e of the main magnetic pole 3400, and it determines the width of the track formed on the magnetic recording layer of the magnetic disk. The width $W_P$ is, for example, between about 0.05~0.5 μm.

Further, the near-field generation end surface 36a of the plasmon-generator 36 is in the vicinity of the end surface 3400e of the main magnetic pole 3400 on the head end surface 2210, and positioned at the leading side (−Z side) of the end surface 3400e. Herein, when the spacing between the near-field generation end surface 36a and the end surface 3400e is defined as $D_{N-P}$, it is preferred that the spacing $D_{N-P}$ is a sufficiently small value of 100 nm or below, and particularly 20 nm or above, and further preferably 30 nm or above.

With the thermally-assisted magnetic recording head of the present embodiment, because the near-field generation end surface 36a is an essential heating action part and the end surface 3400e is the writing part, a writing magnetic field having a sufficiently large gradient can be applied to a sufficiently heated part in the magnetic recording layer of the magnetic disk. Accordingly, a stable writing operation can be reliably implemented through thermal assistance.

In addition, with respect to the near-field generation end surface 36a, in the present embodiment, the bottom edge 361a is held at the trailing side (+Z side) on the head end surface 2210, and the end 360a of the propagative edge 360 is the vertex of the leading side (−Z side) so that an isosceles triangle is formed. The height (thickness of the head end surface 2210 of the plasmon-generator 36) $T_{NF2}$ of the near-field generation end surface 36a is preferably 30 nm or below, and more preferably 20 nm or below. Accordingly, the near-field light emitting position on the near-field generation end surface 36a is in the vicinity of the end edge 361a on the trailing side and becomes closer to the end surface 3400e of the main magnetic pole 3400.

Further, the vertex angle $\theta_{NF}$ in the vertex 360a of the isosceles triangle is preferably between about 60~130 deg., and particularly more preferably between about 80~110 deg. By adjusting the vertex angle $\theta_{NF}$, the light emitting position of the near-field in the near-field generation end surface 36a can be on the trailing side.

Additionally, when the spacing between the waveguide 35 and the main magnetic pole 3400 is $D_{W-P}$, the spacing $D_{W-P}$ can be sufficiently large when the spacing $D_{N-P}$ described above is set to an extremely small value. In other words, according to the structure illustrated in FIG. 9, the waveguide 35 can be sufficiently separated from the main magnetic pole 3400 and the main magnetic pole body part 3401. As a result, a situation can be avoided in which a portion of the laser light is absorbed by the main magnetic pole 3400 made of metal or the main magnetic pole body part 3401, thereby reducing the quantity of light converted to the near-field.

Figure 11:
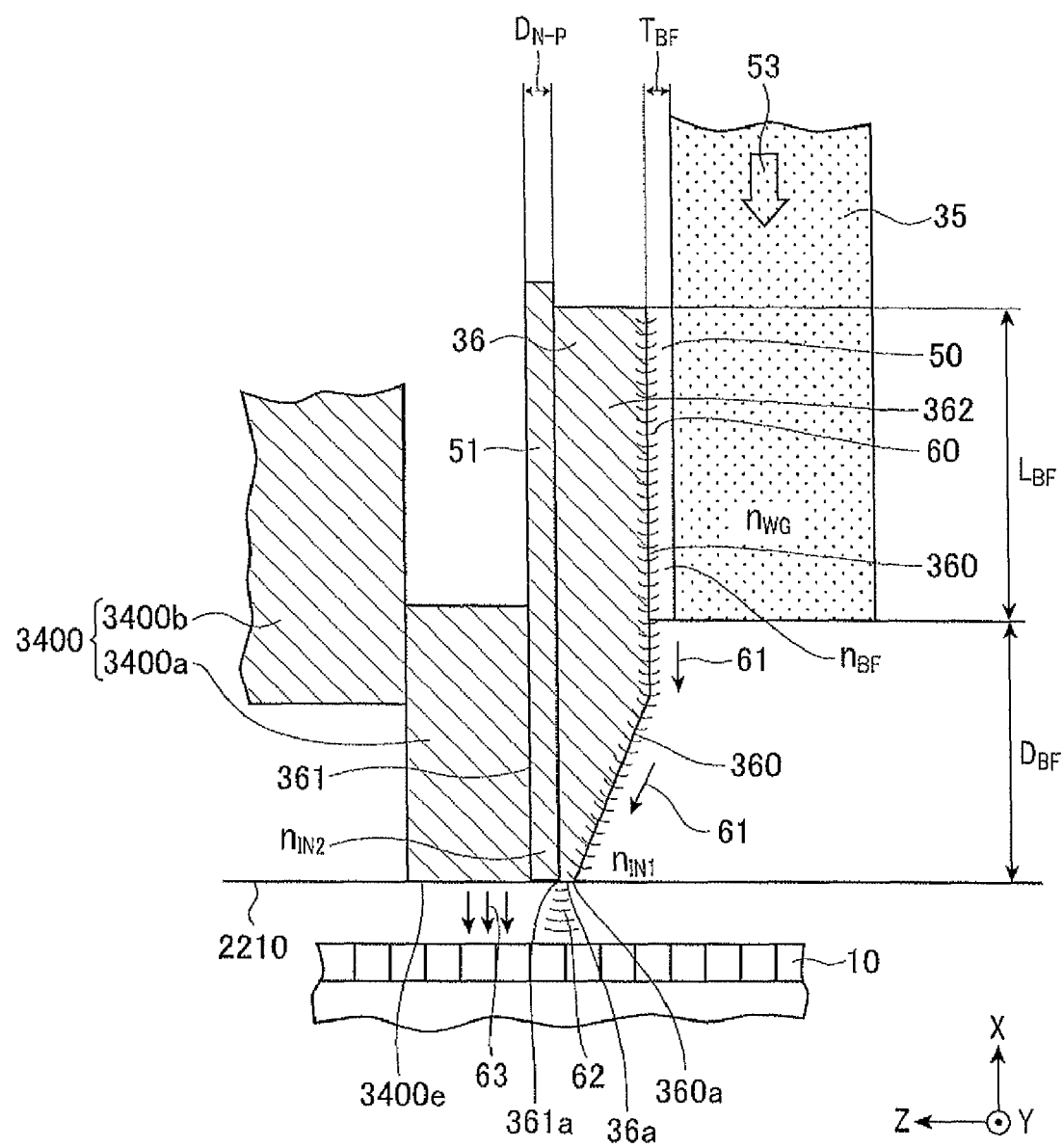
FIG. 11 is a schematic view to explain thermally-assisted magnetic recording utilizing the surface plasmon mode.

FIG. 11 is a schematic for describing thermally-assisted magnetic recording that uses a surface plasmon mode.

As illustrated in FIG. 11, at the time of writing to the magnetic recording layer of the magnetic disk 10 through the electromagnetic conversion element 34, initially, the laser light 53 irradiated from the laser diode 40 of the light source unit 23 propagates through the waveguide 35. Next, the laser light 53 that advances to the vicinity of the buffer portion 50 is coupled with an optical configuration of the waveguide 35 having a refractive index $n_{WG}$, the buffer portion 50 having a refractive index $n_{BF}$, and the plasmon-generator 36 composed of a conductive material such as a metal, and induces the surface plasmon mode to the propagative edge 360 of the plasmon-generator 36. In other words, it is coupled to the plasmon-generator 36 in the surface plasmon mode.

In actuality, the evanescent light within the buffer portion 50 is excited from the optical field conditions of the buffer portion 50 and the waveguide 35 that are the core. Next, the surface plasmon mode is induced in a form in which the evanescent light and the electric load fluctuation is excited by the metal surface (propagative edge 360) of the plasmon-generator 36, thereby exciting the surface plasmon. Moreover, more precisely, what is being excited in this system is the surface plasmon polariton because the surface plasmon, which is the elementary excitation, is coupled with the electromagnetic wave. However, hereinafter surface plasmon polariton will be abbreviated to surface plasmon.

The propagative edge 360 is in the closest position to the waveguide 35 in the inclined lower surface 362 of the plasmon-generator 36, and since the electric field which is the angular part is easily focused, the surface plasmon is easily excited. At this time, the induction of the surface plasmon can be realized by setting so that the refractive index $n_{BF}$ of the buffer portion 50 is set smaller than the refractive index $n_{WG}$ of the waveguide 35 ($n_{BF} < n_{WG}$), and by appropriately selecting the height of the aforementioned buffer portion 50 (of the X direction), namely, the length $L_{BF}$ of the coupled portion of the waveguide 35 and the plasmon-generator 36, and the thickness $T_{BF}$ of the buffer portion 50 (of the Z direction). The induction of the surface plasmon mode is described in, for example, Michael Hochberg, Tom Baehr-Jones, Chris Walker & Axel Scherer, "Integrated Plasmon and Dielectric Waveguides", OPTICS EXPRESS Vol. 12, No. 22, pp 5481-5486 (2004), and in U.S. Patent Publication No. 2005/0249451 A1.

The surface plasmon 60 in the inducted surface plasmon mode is excited on the propagative edge 360 of the plasmon-generator 36 and propagates on the propagative edge 360 along the arrow indicator 61. The propagation of the surface plasmon 60 is realized under the following condition: the propagative edge 360 of the plasmon-generator 36 is covered with a material having the same index as the refractive index $n_{IN2}$ of a material covering the end surface 361 that is opposite to the propagative edge 360, or covered with another material having a higher refractive index $n_{IN1}$ than the index $n_{IN2}$. Actually, it is understood that the preferred condition is that the refractive index $n_{IN1} \geq$ (refractive index $n_{IN2} \times 1.5$). In FIG. 11, the refractive index $n_{IN2}$ of the thermal conductive layer 51 is set to be lower than the refractive index $n_{IN1}$ of the insulating layer 52 that covers the propagative edge 360 of the near-field generation layer 36.

On account of the surface plasmon 60 propagating in this manner, the surface plasmon 60, in other words, the electric field, concentrates on the near-field generation end surface 36a having the vertex 360a which is the arrival point of the propagative edge 360 that reaches the head end surface 2210.

As a result, the near-field 62 is generated from the near-field generation end surface 36a. The near-field 62 is irradiated toward the magnetic recording layer of the magnetic disk 10, reaches the surface of the magnetic disk 10, and heats a portion of the magnetic recording layer of the magnetic disk 10. Accordingly, the anisotropic magnetic field (coercive force) of such a portion is lowered to a level where writing is possible. Immediately thereafter, writing is performed to this portion by applying the writing magnetic field 63 that is generated from the main magnetic pole 3400. Thermally-assisted magnetic recording becomes possible by following this type of sequence in this manner.

Here, as described above, the light emitting position of the near-field 62 on the near-field generation end surface 36a can be positioned at the trailing side (the end edge 361a side) that is nearer to the first main magnetic pole unit 3400a by adjusting the shape and size of the near-field generation end surface 36a on the head end surface 2210. Accordingly, a writing magnetic field having a sufficiently large gradient can be applied to a sufficiently heated part of the magnetic recording layer of the magnetic disk 10. As a result, a stable writing operation can be reliably implemented through thermal assistance.

Further, in the above plasmon-generator 36, the propagative edge 360 in which the surface plasmon propagates is a propagation region that has a very narrow width in the track width direction. Further, the cross-section according to the YZ plane of the plasmon-generator 36 in the present embodiment has a triangular shape, and particularly has a predetermined triangular shape in the vicinity of the head end surface 2210. Therefore, the near-field generation end surface 36a, which is exposed at the polished surface, is formed in a predetermined shape (triangular in the present embodiment) with an extremely small size. Thereby, it is possible to surely propagate the surface plasmon.

In addition, in thermally-assisted magnetic recording that uses the surface plasmon mode such as described above, the optical power efficiency in the plasmon-generator 36 is more or less about 20%, which is in contrast to about 5 to 10% or less, as can be seen in reported examples using a conventional plasmon-generator. This is a significant improvement.

In this manner, protrusions toward the magnetic disk 10 of the near-field generation end surface 36a can be suppressed without the plasmon-generator 36 being heated in an extreme manner.

Further, in the conventional embodiment in which laser light propagated by the waveguide is directly irradiated to the plasmon-generator provided in the head end surface position, a large portion of the irradiated laser light is converted to heat energy within the plasmon-generator. Meanwhile, the size of the plasmon-generator is set to be below the laser light wavelength, and the solid volume thereof is very small. Therefore, the plasmon-generator, on account of this heat energy, reaches extremely high temperatures up to, for example, 500° C. In contrast to this, the thermally-assisted magnetic recording head in the present embodiment utilizes the surface plasmon mode and generates the near-field 62 by propagating the surface plasmon 60 towards the head end surface 2210.

By doing this, the temperature at the time of near-field generation in the near-field generation end surface 36a is greatly reduced to about, for example, 100° C. As a result, protrusion of the near-field generation end surface 36a in a direction toward the magnetic disk 10 is suppressed, thereby enabling favorable thermally-assisted magnetic recording.

Figure 12A:
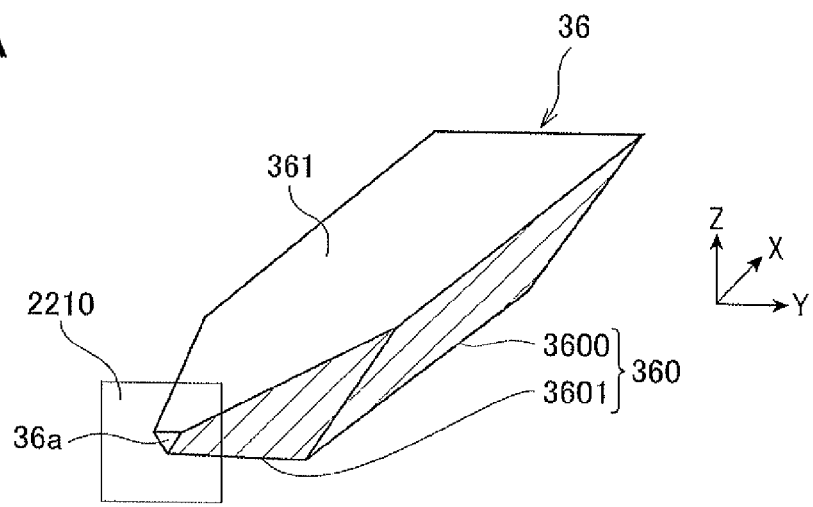
FIGS. 12A through C schematically illustrate various embodiments with the plasmon-generator.
Figure 12B:
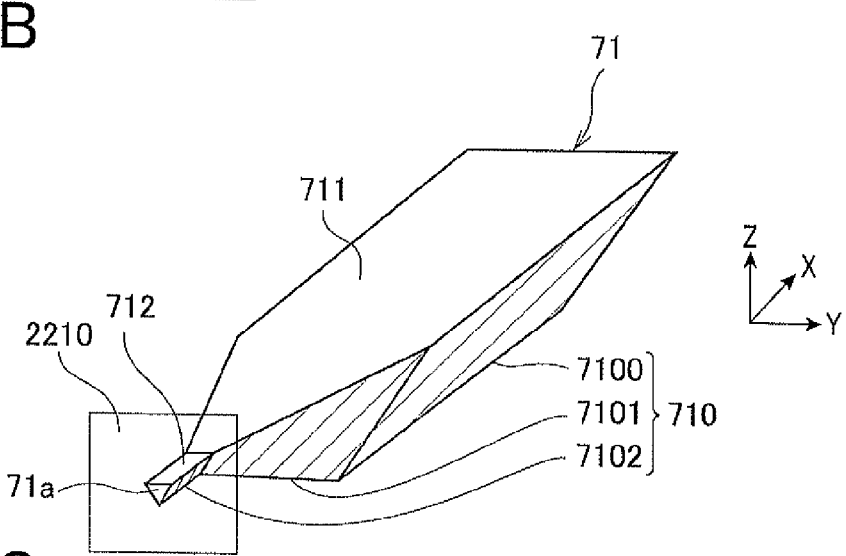
Figure 12C:
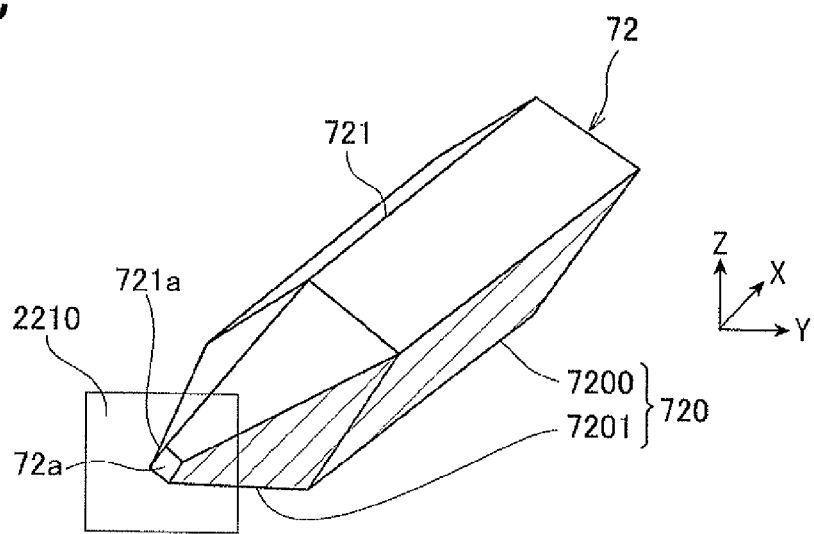

FIGS. 12A~12C are schematic views illustrating various embodiments for the plasmon-generator according to the present invention.

According to the embodiment illustrated in FIG. 12A, the plasmon-generator 36 illustrated in FIG. 9 is blade shaped. Herein, the propagative edge 360 corresponding to the blade tip includes a portion 3600 parallel to the upper surface 361 that is the end surface of the opposite side to the propagative edge 360, and includes a portion 3601 that extends so as to approach the upper surface 361 as moving toward the near-field generation end surface 36a (head end surface 2210) and that reaches the near-field generation end surface 36a. In addition, the cross-sectional shape according to the YZ plane (surface parallel to the head end surface 2210) forms an isosceles triangle with the propagative edge 360 making a vertex, and the shape of the near-field generation end surface 36a also forms an isosceles triangle.

According to the embodiment illustrated in FIG. 12B, the plasmon-generator 71 has a shape in which the protrusion 712 is linked to the portion of the blade shape. Here, the propagative edge 710 corresponding to the blade tip includes a portion 7100 parallel to the propagative edge upper surface 711, a portion 7101 that extends so as to approach the upper surface 711 as moving toward the near-field generation end surface 71a, and a portion 7102 that is parallel to the upper surface 701 and reaches the near-field generation end surface 71a (head end surface 2210). In addition, the cross-sectional shape in the YZ plane (surface parallel to the head end surface 2210) forms an isosceles triangle with the propagative edge 710 forming a vertex, and the shape of the near-field generation end surface 71a also forms an isosceles triangle.

With this manner of plasmon-generator 71, the near-field light emitting position on the near-field generation end surface 71a can be adjusted, for example, more upwardly (+Z direction) by adjusting the size and vertex angle of the isosceles triangle of the near-field generation end surface 71a. As a result, a writing magnetic field having a sufficiently large gradient can be applied to a sufficiently heated part in the magnetic recording layer of the magnetic disk by arranging the plasmon-generator 71 sufficiently near to the main magnetic pole.

According to the embodiment illustrated in FIG. 12C, the plasmon-generator 72 provides a near-field generation end surface 72a that is a square (diamond shaped in the present embodiment). Herein, the propagative edge 720 includes a portion 7200 that is parallel to the upper edge 721, and a portion 7201 that extends so as to approach the upper edge 721 as moving toward the near-field generation end surface 72a and that reaches the near-field generation end surface 72a. In addition, the cross-sectional shape in the YZ plane (surface parallel to the head end surface 2210) forms a square (diamond shaped in the present embodiment) in which the propagative edge 720 portion forms a single vertex.

With this manner of plasmon-generator 72, the light emitting position of the near-field on the near-field generation end surface 72a can be adjusted, for example, to the end 721a of the edge 721 by adjusting the size and vertex angle of the diamond shape of the near-field generation end surface 72a. As a result, a writing magnetic field having a sufficiently large gradient can be applied to a sufficiently heated part of the magnetic recording layer of the magnetic disk by arranging the plasmon-generator 72 sufficiently near to the main magnetic pole.

FIGS. 13A~13D are schematic views illustrating various embodiments that relate to the shape and arrangement of the waveguide according to the present invention, plasmon-generator and the main magnetic pole.

Figure 13A:
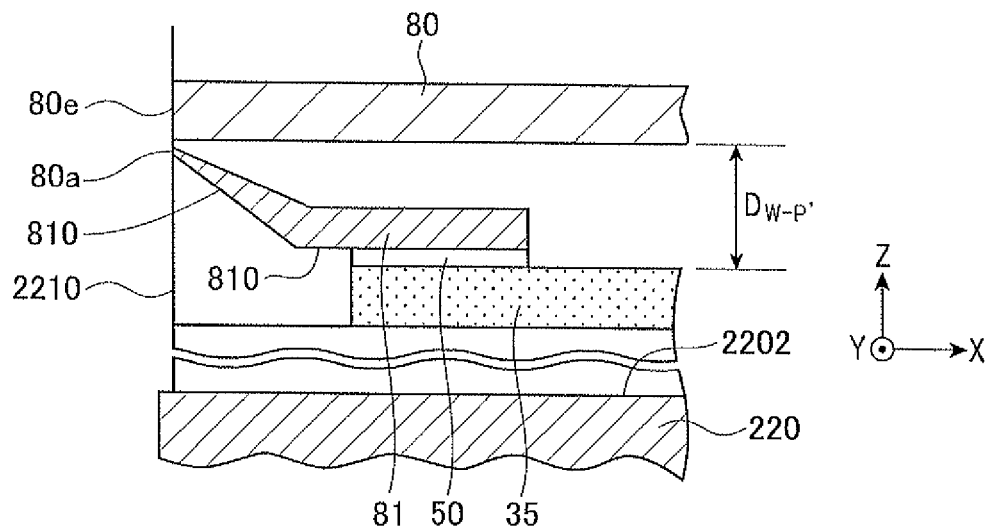
FIGS. 13A through D schematically illustrate various embodiments regarding the shape and arrangement of the waveguide, plasmon-generator and main magnetic pole.

According to FIG. 13A, the main magnetic pole 80 is a single layer that extends in parallel to the element formation surface 2202. Further, the portion of the head end surface 2210 side of the plasmon-generator 81 inclines with respect to the element formation surface 2202 so as to approach the end part of the head end surface 2210 side of the main magnetic pole 80 as moving toward the head end surface 2210. Even in this type of embodiment, on the head end surface 2210, the distance $D_{W-P}'$ in the Z direction between the waveguide 35 and main magnetic pole 80 can be set to a sufficiently large value while positioning the near-field generation end surface 81a of the plasmon-generator 81 in the vicinity of the end surface 80e of the main magnetic pole 80. Accordingly, it is more surely possible to avoid a situation where a portion of laser light is absorbed by the main magnetic pole, causing a reduction of a light quantity that is to be converted to the near-field.

Figure 13B:
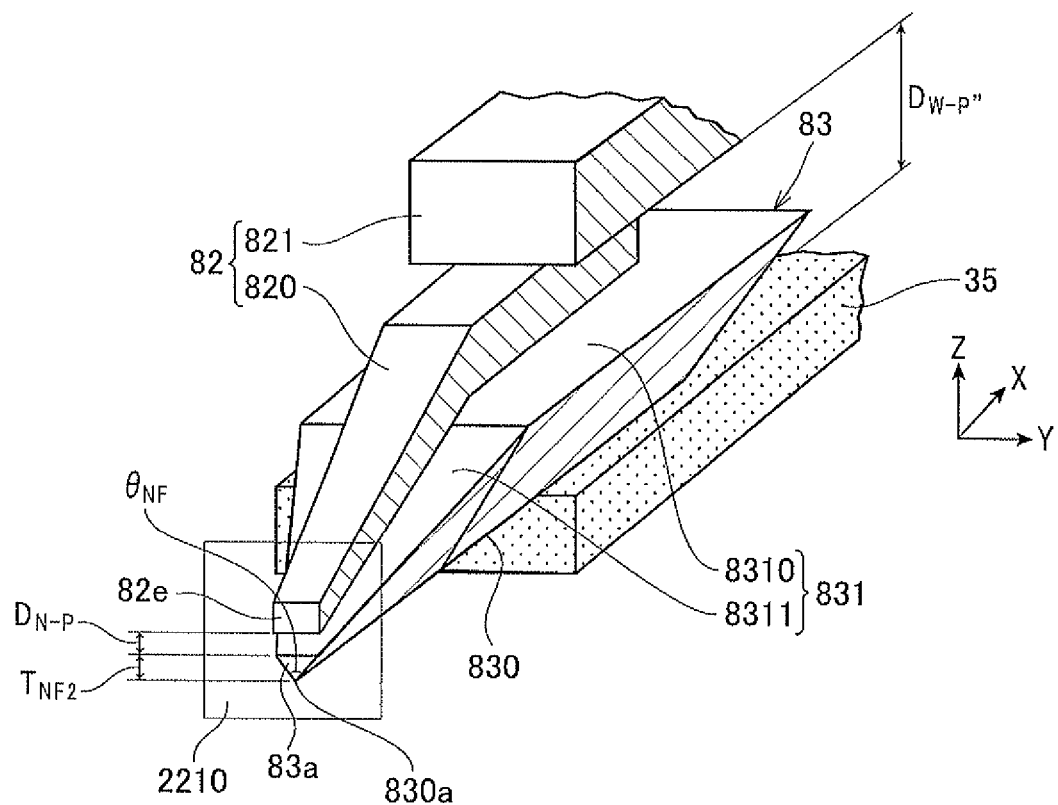

According to FIG. 13B, the plasmon-generator 83 provides a propagative edge 830 that extends in a straight line to reach the near-field generation end surface 83a. Further, the end surface 831 that is the opposite side to the propagative edge 830 of the plasmon-generator 83 includes a portion 8310 that is parallel to the propagative edge 830 and a portion 8311 that inclines so as to approach the propagative edge 830 as moving toward the near-field generation end surface 83a. In addition, the cross-sectional shape in the YZ plane (surface parallel to the head end surface 2210) of the plasmon-generator 83 forms an isosceles triangle with the propagative edge 830 making a vertex, and the shape of the near-field generation end surface 83a also forms an isosceles triangle.

Further, the main magnetic pole layer 82 includes a main magnetic pole 820 and a main magnetic pole body part 821. Of these, the portion of the head end surface 2210 side of the main magnetic pole 820 inclines so as to approach the portion of the head end surface 2210 side of the plasmon-generator 83, in other words, the end surface portion 8311, as moving toward the head end surface 2210. Even in this type of embodiment, on the head end surface 2210, the distance $D_{W-P}"$ in the Z direction between the waveguide 35 and the main magnetic pole 82 can be set to a sufficiently large value while positioning the near-field generation end surface 83a of the plasmon-generator 83 in the vicinity of the end surface 82e of the main magnetic pole 82. Accordingly, it is more surely possible to avoid a situation where a portion of laser light is absorbed by the main magnetic pole, causing a reduction of a light quantity that is to be converted to the near-field.

Figure 13C:
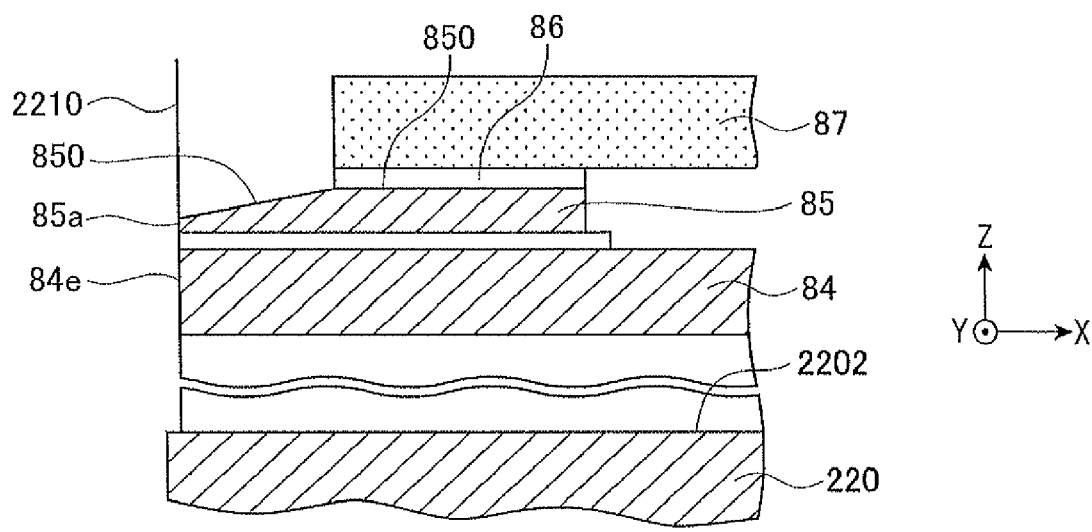

According to FIG. 13C, in the present embodiment, the main magnetic pole 84, the plasmon-generator 85, the buffer portion 86, and the waveguide 87 are layered in order from the slider substrate 220 side toward the +Z direction. Further, the propagative edge 850 that propagates the surface plasmon is positioned at the opposite side to the main magnetic pole 84 of the plasmon-generator 85, and extends to the near-field generation end surface 85a. As a result, the near-field generation end surface 85a is arranged at the trailing side (+Z side) of the end surface 84e of the main magnetic pole 84 on the head end surface 2210. Even in this type of embodiment, a writing magnetic field having a sufficiently large gradient can be applied to a sufficiently heated part of the magnetic recording layer of the magnetic disk by arranging the surface near-field generation end surface 85a sufficiently near to the end surface 84e of the main magnetic pole 84.

Figure 13D:
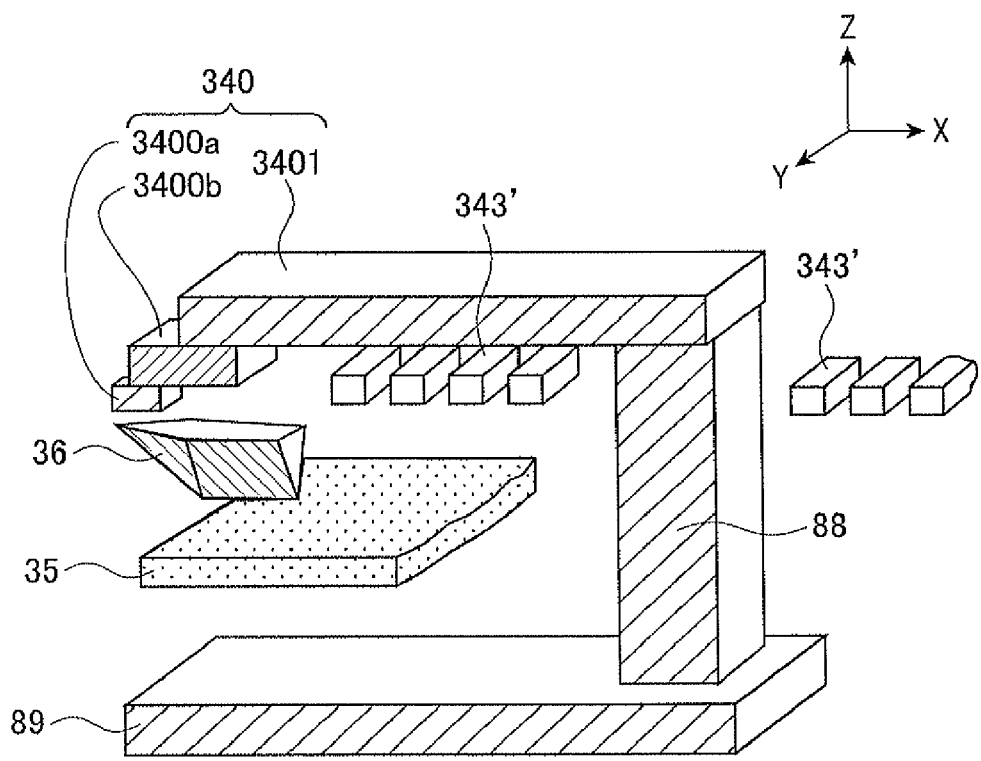

In the embodiment illustrated in FIG. 13D, the arrangement of the waveguide 35, the plasmon-generator 36, and the main magnetic pole layer 340 is the same as the embodiment illustrated in FIG. 8 and FIG. 9; however the write shield layer 89 that is the return yoke to receive the magnetic flux that returns from the magnetic disk is provided at the opposite side to the waveguide 35 and the main magnetic pole layer 340 of the plasmon-generator 36, namely, the leading side (−Z side). Further, the write shield layer 89 and the main magnetic pole layer 340 are electrically connected by the back contact part 88. In addition, the write coil layer 343' is formed such that a part of the write coil layer 343 is disposed between at least the main magnetic pole layer 340 and the write shield layer 89 during a single revolution, and has a spiral structure that is rotated around the back contact part 88 as the center. Even in this type of embodiment, favorable thermally-assisted magnetic recording can be performed using the surface plasmon of the present invention.

Figure 14:
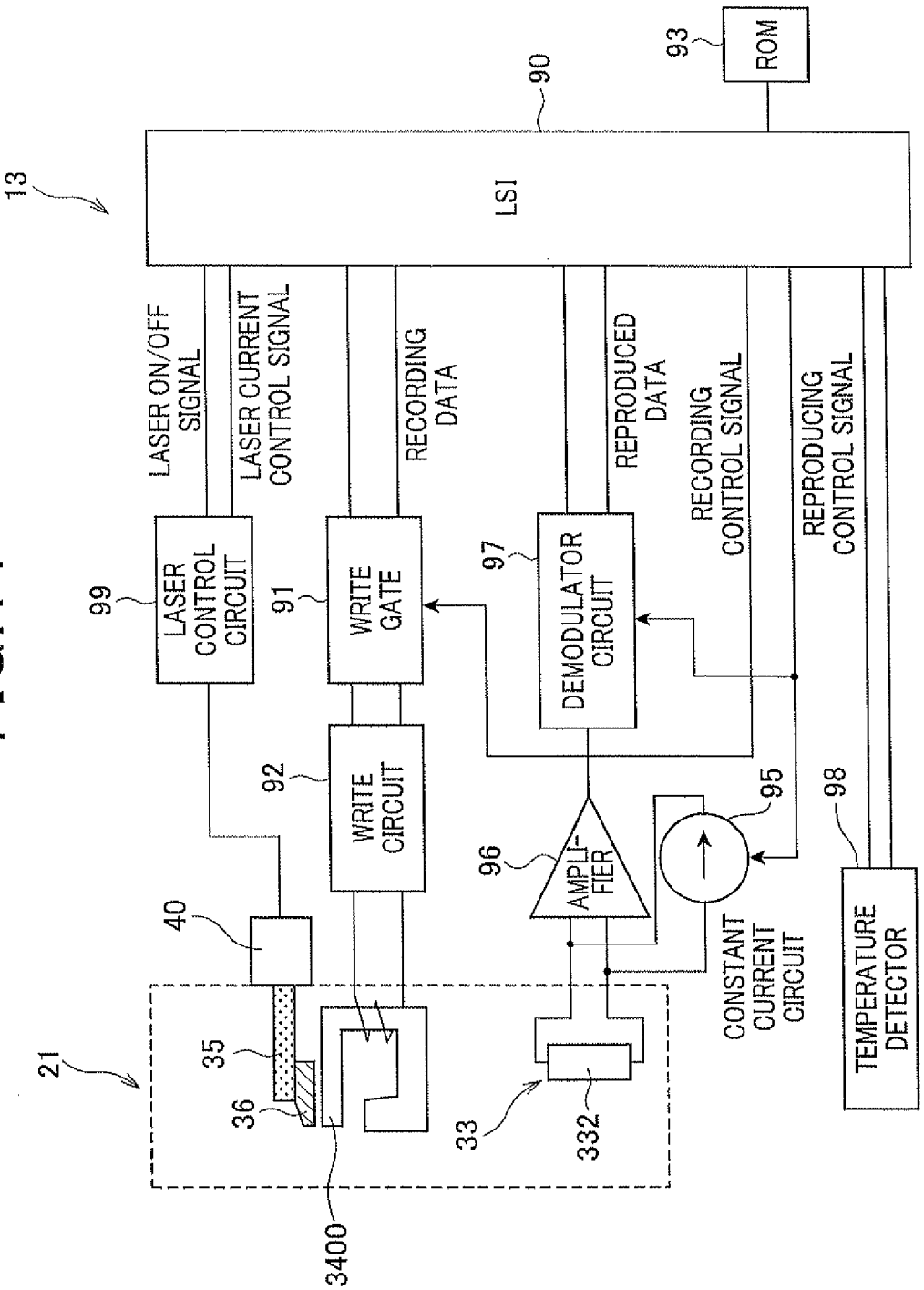
FIG. 14 is a block view illustrating the circuit structure of the light emission control circuit and recording reproducing of the magnetic disk device illustrated in FIG. 6.

FIG. 14 is a block view illustrating the circuit configuration of the record reproduction and light emitting control circuit 13 of the magnetic disk device illustrated in FIG. 6.

Respectively illustrated in FIG. 14, 90 is a control large-scale integration (LSI); 91 is a write gate to receive the recorded data from the control LSI 90; 92 is a write circuit; 93 is a read-only memory (ROM) for storing control tables of operating current values that are supplied to the laser diode 40; 95 is a constant current circuit for supplying sense current to the MR element 33; 96 is an amplifier for amplifying the output voltage of the MR element 33; 97 is a demodulator circuit for amplifying reproduced data in relation to the control LSI 90; 98 is a temperature detector; and 99 is a control circuit for the laser diode 40.

The recorded data output from the control LSI 90 is supplied to the write gate 91. The write gate 91 supplies the recorded data to the write circuit 92 only when the recording control signal that is output from the control LSI 90 instructs a writing operation. The write circuit 92 sends write current to the write coil layer 343 according to the recorded data, and writing is performed onto the magnetic disk by the writing magnetic field generated from the main magnetic pole 3400.

Constant current flows from the constant current circuit 95 to the MR multilayer 332 only when the reproducing control signal that is output from the control LSI 90 instructs a reading operation. The signal reproduced by the MR element 33 is demodulated by the demodulator circuit 97 after being amplified by the amplifier 99, and the obtained reproduction data is output to the control LSI 90.

The laser control circuit 99 receives the laser ON/OFF signal and the operating current control signal that are output from the control LSI 90. When the laser ON/OFF signal is an ON operation instruction, an operating current which meets or exceeds the oscillating threshold value is applied to the laser diode 40. Accordingly, the laser diode 40 illuminates, and laser light propagates the waveguide 35 to couple with the plasmon-generator 36 in the surface plasmon mode. Accordingly, the near-field is generated from the end of the plasmon-generator 36, is irradiated to the magnetic recording layer of the magnetic disk, and heats the magnetic recording layer. The operating current value at this time is controlled to a value that corresponds to the operating current control signal. The control LSI 90 generates a laser ON/OFF signal according to the timing with the recording and reproducing operations, and considers the temperature and the like of the magnetic recording layer of the magnetic disk measured by the temperature detector 98, and determines a value for the operating current value control signal based on a control table within the ROM 93. Herein, the control table may include not only oscillating threshold values and temperature dependencies for light output—operation current properties, but also data with respect to the relationship between the operating current values and the temperature rise portion of the magnetic recording layer where the thermally-assisted operation is received, as well as data with respect to temperature dependencies for an anisotropic magnetic field (coercive force) of the magnetic recording layer. As discussed, by providing laser ON/OFF signals and operating current value control signal system separately from the recording/reproducing operating control signal system, the laser diode 40 that is simply linked to the recording operation can be energized by distributing power thereto. Also, a more diverse power distribution mode can be realized.

Moreover, the circuit configuration of the recording/reproducing and light emitting control circuit 13 is obviously not limited to that illustrated in FIG. 14. Writing operations and reading operations may be specified by signals other than the recording control signal and the reproducing control signal.

A more detailed description will be given of the present invention by giving a specific embodiment regarding the optical waveguide of the present invention described above.

In regard to the optical waveguide of the present invention described above, further explanation is given about the present invention describing a specific embodiment.

Experimental Example 1

An experimental example for analysis by using a simulation is given hereafter regarding the relationship between the length of the spot size converter member (triangular taper length) and the optical power efficiency ∈ in each of the structures where: the first triangular plate-like spot size converter member and the second triangular plate-like spot size converter member are arranged and formed in a symmetrical structure (present invention); and the triangular plate-like spot size converter member is arranged at only one side (comparative example).

(Simulation Conditions)

Core material (including the spot size converter member): TaOx (refractive index: 2.15) Cladding material: $Al_2O_3$ (refractive index: 1.65)

Laser light incidence side cross sectional area: 4×4 μm ($t1+t0+t2=4$ μm; $W1=W2=W0=4$ μm)

Cross sectional area of the waveguide core part (cross sectional area of the minimum cross section part): 0.5× 0.4

Laser light used: wavelength 800 nm, TM

Length of the spot size converter part is the parameter (however, on condition that $L1=L2 (=L0)$ in FIG. 2)

FFP (far field pattern): perpendicularity θy=31 deg., parallel θx=9 deg.

Figure 15:
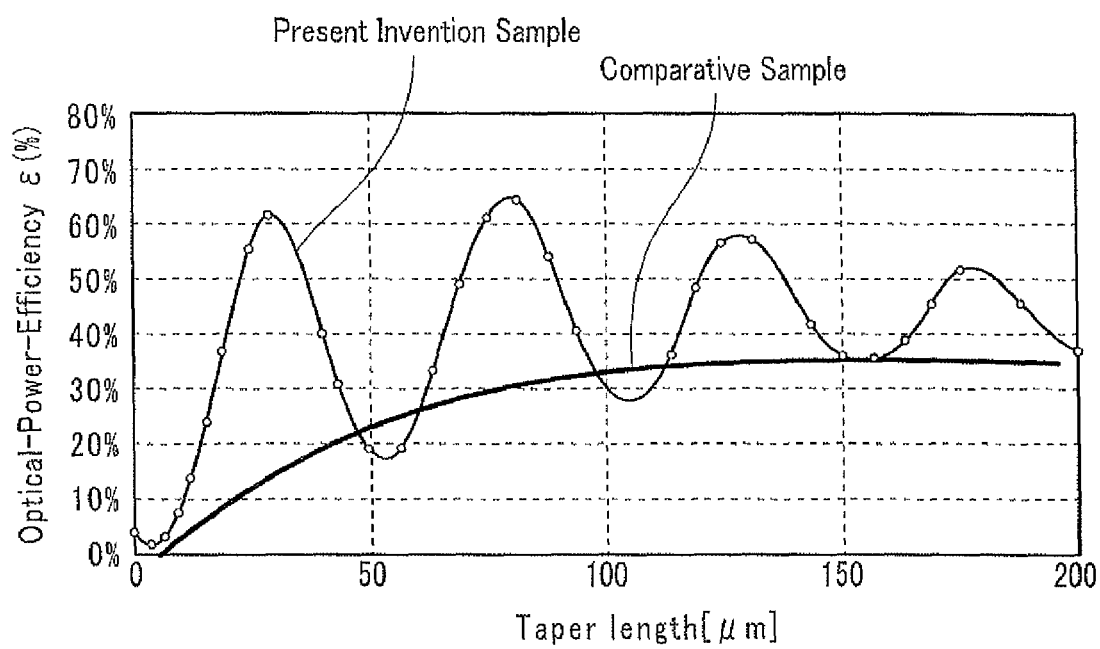
FIG. 15 is a graph illustrating the design for improving optical power efficiency and shortening the length of the waveguide with the structure in the present invention.

The results analyzed by simulations are illustrated graphically in FIG. 15.

According to the results illustrated in FIG. 15, the present invention sample shows a wavy peak on a periodic basis. Therefore, the configuration is assumed to be able to apply phase resonance of a wavelength. Further, even a place where the taper length (for instance, equivalent to L1 and L2 in FIG. 2) is short (for instance, approximately 30 μm and 80 μm), is understood to obtain an extremely high optical power efficiency ∈, thereby enabling high efficiency and small size to be devised.

Conversely, with the comparative example in which a spot size converter is provided on only one side, the wave peaks do not appear cyclically and it can be understood that the optical power efficiency ∈(=propagative efficiency×coupling efficiency) is less than 35% regardless of the value of the taper length.

Further, even if the thickness of the spot size converter provided to only one side is doubled, the optical power efficiency ∈ is reduced and is less than 35%.

Experimental Example II

A simulated experiment was performed in accordance with the form of the first experimental example to verify the level in which two triangular plate-like spot size converter members are arranged and formed in a substantially symmetrical structure. The parameter is the size of two triangular plate-like spot size converter members, and more specifically, to obtain the propagative efficiency at the time when the thicknesses t1, t2, and the taper lengths L1, L2 are suitably set as the parameters shown in FIG. 2, FIG. 4, and FIG. 5.

The results are shown below in Table 1 and Table 2.

TABLE 1

| (L1 = L2 = 80 μm) | | |
|---|---|---|
| t2 (%) | t1 (%) | Propagative Efficiency (%) |
| 100 | 0 | 13 |
| 90 | 10 | 14 |
| 80 | 20 | 21 |
| 70 | 30 | 37 |
| 60 | 40 | 57 |

TABLE 1-continued

| (L1 = L2 = 80 μm) | | |
|---|---|---|
| t2 (%) | t1 (%) | Propagative Efficiency (%) |
| 50 | 50 | 65 |
| 40 | 60 | 57 |
| 30 | 70 | 37 |
| 20 | 80 | 21 |
| 10 | 90 | 14 |
| 0 | 100 | 13 |

The units for t1 and t2 in Table 1 are shown in %. When t1=100% and t2=100%, the thickness of the two triangular plate-like spot size converter members become 1.8 μm. In addition, L1=L2=80 μm.

TABLE 2

| (t1 = t2 = 1.8 μm) | | |
|---|---|---|
| L2 (%) | L1 (%) | Propagative Efficiency (%) |
| 100 | 100 | 65 |
| 100 | 80 | 59 |
| 100 | 60 | 39 |
| 100 | 40 | 20 |
| 100 | 20 | 10 |
| 100 | 0 | 5 |

The units for L1 and L2 in Table 2 are shown in %. When L1=100% and L232 100%, it results in 80 μm. The actual thickness of the two triangular plate-like spot size converter members becomes 1.8 μm.

According to these results, because the optical waveguide of the present invention is arranged and formed so that a first triangular plate-like spot size converter composed from the same material as the core material and a second triangular plate-like spot size converter have a substantially symmetrical structure and are configured in a form with the ability to apply phase resonance of a wavelength, shortening of the waveguide length becomes possible allowing a smaller size to be devised. Further, an optical waveguide having excellent spot size conversion efficiency can be obtained even in a reduced size.

What is claimed is:

1. An optical waveguide that is structured with a core that is a waveguide where light is propagated, a clad that surrounds the periphery thereof, and a spot size converter member; wherein a refractive index of a material composing the core is larger than another refractive index of a material composing the clad, wherein the core provides a light incidence plane end surface that is one side where light enters and a light emitting plane end surface where light propagated in the waveguide is emitted, and the light incidence plane end surface at which the light enters, a taper portion that is a plate-like body of a nearly trapezoidal shape when viewed from a level plane and where a rectangular cross-section gradually decreases when advancing internally from the light incidence plane end surface, a waveguide core part that is linked to a minimum cross-section part of the taper portion and that extends to a targeted waveguide position while maintaining the cross-sectional area of the minimum cross section part for mainly propagating the light in a single mode; and the taper portion that is the plate-like body of nearly a trapezoidal shape provides a first plane and a second plane of nearly a trapezoidal shape, and on both of these planes, a first triangular plate-like spot size converter member and a second triangular plate-like spot size converter member composed of the same material as the core material are respectively arranged and formed in a substantially symmetrical structure.

2. The optical waveguide of claim 1, wherein
a condition, $t1:t2=7:3\sim3:7$, is satisfied,
where a thickness of the first triangular plate-like spot size converter member is $t1$ and a thickness of the second triangular plate-like spot size converter member is $t2$.

3. The optical waveguide of claim 1, wherein
a condition, $t1:t2=6:4\sim4:6$, is satisfied,
where a thickness of the first triangular plate-like spot size converter member is $t1$ and a thickness of the second triangular plate-like spot size converter member is $t2$.

4. The optical waveguide of claim 1, wherein
a condition, $L1:L2=10:6\sim6:10$, is satisfied,
where a length of the first triangular plate-like spot size converter member is $L1$ and a length of the second triangular plate-like spot size converter member is $L2$.

5. The optical waveguide of claim 1, wherein
a condition, $L1:L2=10:8\sim8:10$, is satisfied,
where a length of the first triangular plate-like spot size converter member is $L1$ and a length of the second triangular plate-like spot size converter member is $L2$.

6. The optical waveguide of claim 1, wherein
a width $W0$ of the light incidence plane end surface of the taper portion that is the nearly triangular plate-like body, a width $W1$ of the light incidence plane end surface of the first triangular plate-like spot size converter member, and a width $W2$ of the light incidence plane end surface of the second triangular plate-like spot size converter member have the same size and the widths are in a range of $0.1\sim10$ μm.

7. The optical waveguide of claim 1, wherein
a total thickness sum of the thickness $t0$ of the light incidence plane end surface of the taper portion that is the nearly triangular plate-like body, a thickness $t1$ of the light incidence plane end surface of the first triangular plate-like spot size converter member, and a thickness $t2$ of the light incidence plane end surface of the second triangular plate-like spot size converter member is in a range of $0.1\sim10$ μm.

8. The optical waveguide of claim 1, wherein
a length $L0$ (depth) of the taper portion that is the nearly triangular plate-like body is in a range of $5\sim500$ μm, and a width $W0min$ of a minimum cross-section part that is the rear end of the taper portion, is in a range of $0.01\sim2$ μm.

9. The optical waveguide of claim 1, wherein
a condition, $\theta1>\theta0$ and $\theta2>\theta0$, is satisfied,
when comparing a taper angle $\theta0$ of the taper portion that is the nearly triangular plate-like body, a taper angle $\theta1$ of the first triangular plate-like spot size converter member, and a taper angle $\theta2$ of the second triangular plate-like spot size converter member.

10. The optical waveguide of claim 1, wherein
depth tip positions of the first and second triangular plate-like spot size converter members are respectively either in the same position as the minimum cross-section part that is the rear end of the taper portion, or in a range of $-92\sim+150$ μm with respect to a position of a minimum cross-section part that is the rear end of the taper portion as the basis.

11. A thermally-assisted magnetic recording head, comprising:
a magnetic pole where a writing magnetic field is generated from an end surface of an air baring surface side;
the waveguide of claim 1 where light for exciting plasmon is propagated; and
a plasmon-generator where the light is coupled in a plasmon mode.

* * * * *